US012057095B2

(12) United States Patent
Capella

(10) Patent No.: US 12,057,095 B2
(45) Date of Patent: Aug. 6, 2024

(54) METHODS AND DEVICES FOR PLECTRA WITH IMPROVED ERGONOMICS

(71) Applicant: Richard Capella, San Diego, CA (US)

(72) Inventor: Richard Capella, San Diego, CA (US)

( * ) Notice: Subject to any disclaimer, the term of this patent is extended or adjusted under 35 U.S.C. 154(b) by 0 days.

(21) Appl. No.: 17/955,436

(22) Filed: Sep. 28, 2022

(65) Prior Publication Data

US 2024/0105148 A1 Mar. 28, 2024

(51) Int. Cl.
*G10D 3/173* (2020.01)

(52) U.S. Cl.
CPC .................................... *G10D 3/173* (2020.02)

(58) Field of Classification Search
CPC ...................................................... G10D 3/173
See application file for complete search history.

(56) References Cited

U.S. PATENT DOCUMENTS 4,150,601 A 4/1979 Henley, Jr.
6,346,662 B1 2/2002 Sielaff
9,263,007 B2 2/2016 Goble
9,418,632 B2 8/2016 Snyder
9,691,365 B2 1/2017 Pascale
9,947,300 B2 4/2018 Altavilla
D890,839 S 7/2020 Richard
2012/0232857 A1 9/2012 Fisker
2014/0202309 A1 7/2014 Gauthier
2015/0143973 A1* 5/2015 Caccia .................. G10D 3/173 84/322
2019/0304414 A1* 10/2019 Holcomb ............... G10D 3/173
2023/0100336 A1* 3/2023 Goold .................... G10D 3/173 84/322

FOREIGN PATENT DOCUMENTS

DE 102004027595 A1 1/2006

OTHER PUBLICATIONS bogstreet.com; Bog Street Pick Your Passion; https://bogstreet.com/pages/picks; accessed on Sep. 28, 2022.
https://reverb.com/uk/item/1272567-w4m-dark-rosewood-luxury-guitar-pick-std-shape-right-hand-dimple-thumb-groove-index; Reverb.com; Guitar Pick; downloaded Nov. 1, 2023.
https://www.dugainplectrums.com/index.html; Dugain Guitar Picks; downloaded Nov. 1, 2023.
https://www.dugainplectrums.com/ergonomic-right-handed-picks-index-2.html; Ergonomic right-handed picks; downloaded Nov. 1, 2023.

* cited by examiner

*Primary Examiner* — Kimberly R Lockett
(74) *Attorney, Agent, or Firm* — The Inventor's Friend Patent Law Firm, P.L.L.C.; Nathaniel A. Wickliffe

(57) ABSTRACT

A system and method for ergonomic plectra with improved grip can include plectra with one or more cradles adapted to accommodate a finger of a user. The ergonomic plectra can be customized for an individual user by providing cradles with preferred sizes and/or angles adapted for the user. The ergonomic plectra can be modular, and can be built with module components. Module components can include nodes having different cradle sizes and angles.

13 Claims, 31 Drawing Sheets

METHODS AND DEVICES FOR PLECTRA WITH IMPROVED ERGONOMICS

FIELD OF THE INVENTION

This application relates to plectra, such as guitar picks, and more particularly, to improved ergonomics and grip for a musician using a plectrum.

BACKGROUND OF THE INVENTION

Plectra are typically flat, and often gripped between index finger and thumb to support the plectrum in such a way that it can pluck the strings of a stringed instrument, such as a guitar, mandolin, ukulele, and others. However, being flat allows the plectrum, if not gripped sufficiently tight, to slip in translation, and/or to rotate in such a way that the tip, or strike zone, of the pick is no longer ideally situated to pluck the instrument. This can lead to plucking/rubbing of strings with fingers or a portion of the pick that is not at the ideal strike zone. Additionally, this can lead to loss of the plectrum altogether during a performance.

FIG. 1A is a perspective view of a traditional, prior art plectrum, according to an illustrative embodiment, and FIG. 1B is a perspective view of a traditional, prior art plectrum being gripped between a thumb and index finger, according to an illustrative embodiment. As shown in FIG. 1A, an embodiment of a traditional prior art plectrum 100 is substantially flat with a strike zone 102 that makes contact with the string of a stringed instrument. The plectrum 100 has a first side 104 and a second side 106 (not shown), and both sides 104 and 106 are substantially flat. In an embodiment, the plectrum can be gripped between the thumb and the index finger, with the thumb on one side and the index finger on the other side. The plectrum 100 can have a central axis 108 that extends from the tip of the strike zone along the length of the plectrum 100. FIG. 1B shows one musician's ideal placement for holding a plectrum and striking an instrument string, however, it should be clear that different musicians may prefer different ways of holding a plectrum, including different rotations, translations, finger positions, etc. As shown in FIG. 1B, the plectrum 100 is pinched between the thumb 112 and index finger 114, so that the strike zone 102 at the tip of the plectrum can be used to pluck the string 120. In the case of the traditional flat plectrum 100, the plectrum can easily slip in translation in the direction of arrow T, resulting in the plectrum moving into a position such as 130, shown in outline, wherein a much smaller portion of the pick is protruding out from the finger and thumb and resulting in a much smaller strike zone 120. The flat plectrum 100 can also rotate along arrow R, resulting in the plectrum moving into a position such as 140, shown in outline, wherein the strike zone is no longer ideally positioned relative to the string.

These undesirable movements of the plectrum between the fingers result in the plectrum being out of position, and require a musician to pause and reposition the plectrum while playing. A musician may also experience fatigue from pinching the plectrum tightly enough to prevent movement of the plectrum. Furthermore, it is common for the plectrum to fall out of the hand completely. In all cases, undesired movement of the pick or loss of the pick can hinder performance and enjoyment while playing the instrument.

It would be desirable to have a plectrum that is less likely to slide or rotate between the fingers. It would be further desirable to have a plectrum that is easy to grip, so that fatigue is reduced and enjoyment is increased.

SUMMARY OF THE INVENTION

As described herein, this disclosure overcomes disadvantages of the prior art by providing various devices that result in concavities on one or both sides of the plectrum. These concavities can match the contours of the fingers that are used to pinch/hold the plectrum, and can mitigate slippage, translation, and loss of the plectrum. As used herein, the word "finger" can be used to describe any of the five digits on a hand, including the thumb, index finger, ring finger, and others. These devices can include various pads or other contoured surfaces that can be a part of, or attached to, a traditional flat plectrum. As described herein, various methods can include methods of customizing pads and/or methods of providing different pads for different musicians who may have different sizes of fingers, different gripping styles and/or gripping positions, etc.

In an embodiment, an ergonomic plectrum can include a plectrum base and at least one cradle, the cradle adapted to partially engage with a finger of a user. The plectrum base can be planar, and the at least one cradle can be raised above the planar plectrum. The at least one cradle can be defined by a curved contact surface. The ergonomic plectrum can include at least one node, wherein the at least one node can be a concavity within the node. The at least one cradle can include two cradles, wherein a thumb cradle can be adapted to partially engage with a thumb, and a non-thumb finger cradle can be adapted to partially engage with a non-thumb finger. The thumb cradle can be at a first angle adapted to accommodate a thumb, and the non-thumb finger cradle can be at a second angle adapted to accommodate a non-thumb finger. The thumb cradle can have a curved surface with a shape that is adapted to accommodate and partially encircle a thumb, and the non-thumb finger cradle can have a curved surface with a shape that is adapted to accommodate and partially encircle a non-thumb finger.

In an embodiment, a modular customized plectrum system can include a plectrum base and at least one module node, the at least one module node having a cradle, and the at least one module node adapted to be attached to the plectrum base. The plectrum base can include at least one keyhole, and the at least one module node can have at least one key, wherein the at least one key can be adapted to engage the at least one keyhole, wherein the at least one key and at least one keyhole can maintain the at least one node in a fixed position relative to the plectrum base. The at least one module node can be adapted to be secured to the plectrum base at an angle that is adapted to accommodate a finger of a user. The at least one module node can include at least two module nodes, and wherein a first module node can be adapted to be secured to the plectrum base at an angle that is adapted to accommodate a thumb of a user, and wherein a second module node can be adapted to be secured to the plectrum base at an angle that is adapted to accommodate a non-thumb finger of a user.

In an embodiment, a customized plectrum kit can include a plurality of different thumb nodes, wherein the thumb nodes can include at least three different sizes of thumb cradles, the thumb nodes adapted to be attached to a plectrum base, and a plurality of different non-thumb finger nodes, wherein the non-thumb finger nodes can include at least three different sizes of finger cradles, the non-thumb finger nodes adapted to be attached to the plectrum base. The plurality of different thumb nodes can include at least three different cradle angles for each of the at least three different sizes of thumb cradles, and wherein the plurality of different non-thumb finger nodes can include at least three different cradle angles for each of the at least three different sizes of non-thumb cradles. The plurality of different thumb nodes can include at least three different attack positions for each of the at least three different sizes of thumb cradles, and wherein the plurality of different non-thumb finger nodes can include at least three different attack positions for each of the at least three different sizes of non-thumb cradles. The nodes can have at least one key on the back of the nodes, the key adapted to engage with at least one keyhole on the plectrum base.

In various embodiments, a method for providing customized plectra can include determining a preferred size for at least one cradle, determining a preferred angle for the at least one cradle, and providing at least one node having the preferred cradle size and preferred cradle angle, the at least one node adapted to be attached to a plectrum base. The at least one node can include a thumb cradle and a non-thumb finger cradle, and wherein determining a preferred size for the at least one cradle can include determining a preferred size for the thumb cradle and for the non-thumb finger cradle, and wherein determining a preferred angle for the at least one cradle can include determining a preferred angle for the thumb cradle and for the non-thumb finger cradle, and wherein providing at least one node includes providing a thumb node with the preferred thumb cradle size and preferred thumb cradle angle and a non-thumb finger node with the preferred non-thumb finger cradle size and preferred non-thumb finger cradle angle. The method can include using a rotary cradle angle tool for determining the optimal angle of the at least one cradle. The method can include determining a preferred plectrum base and providing the preferred plectrum base.

BRIEF DESCRIPTION OF THE DRAWINGS

Several embodiments are illustrated by these accompanying drawings, of which.

DETAILED DESCRIPTION

The ergonomics of a plectrum can be improved by providing contours on the first side of the plectrum, the second side of the plectrum, or both sides of the plectrum. As used herein, the word plectrum can refer to a guitar pick as well as various other picks designed to be held in the hand and used to make the strings of a stringed instrument vibrate, including the strings of mandolins, ukuleles, and other stringed instruments. As used herein, the words plectrum and pick are used synonymously, and it should be clear that the use of these picks/plectra is contemplated for various stringed instruments, however, in the interest of brevity, only guitars are specifically referenced herein. It should be clear that the use of the word “pick” includes various plectra and the use of the word “plectra” includes various picks. As discussed herein, a plectrum may be described as having one side adapted for a thumb and a second side adapted for an index finger, however, it is specifically contemplated that a plectrum can be adapted to be grasped between a thumb and any other finger on the same hand, however, in the interest of brevity, the plectrum will be described herein as being held between the thumb and index finger. The index finger can also be referred to as the first finger. Furthermore, as used herein, the word “finger” can be used to describe any of the five digits on a hand, including the thumb, index finger, middle finger, ring finger, and pinkie, however, the word “thumb” specifically refers to only the thumb, also known as the pollex. As used herein, the term “non-thumb finger” can specify any finger other than the thumb, including the index finger, middle finger, ring finger, and pinkie.

Figure 2B:
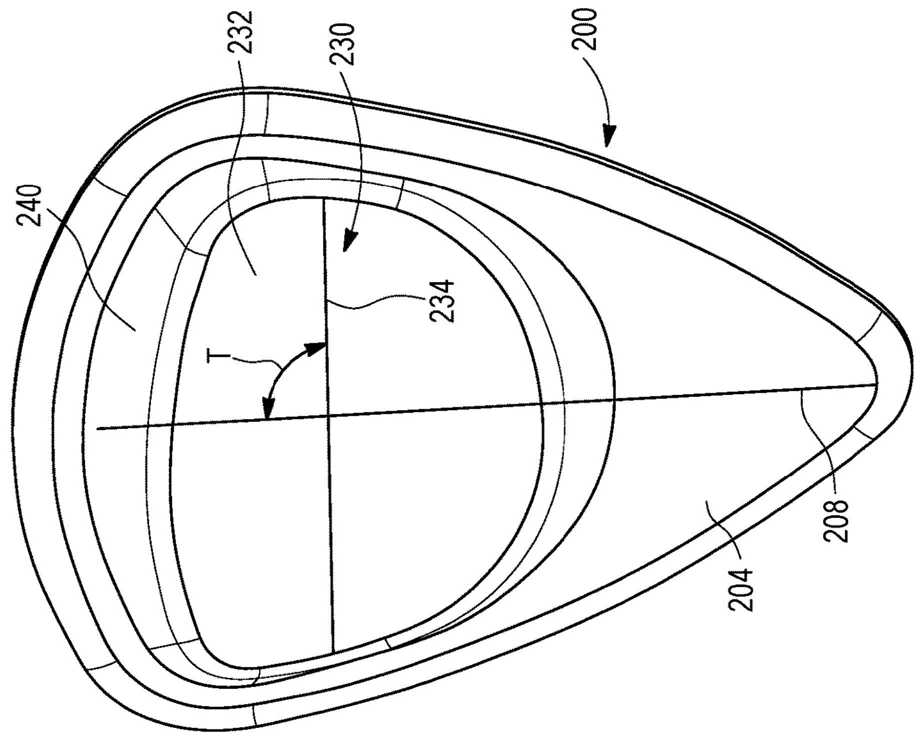
FIG. 2B is a perspective view of a thumb side of an ergonomic plectrum according to an illustrative embodiment.
Figure 2A:
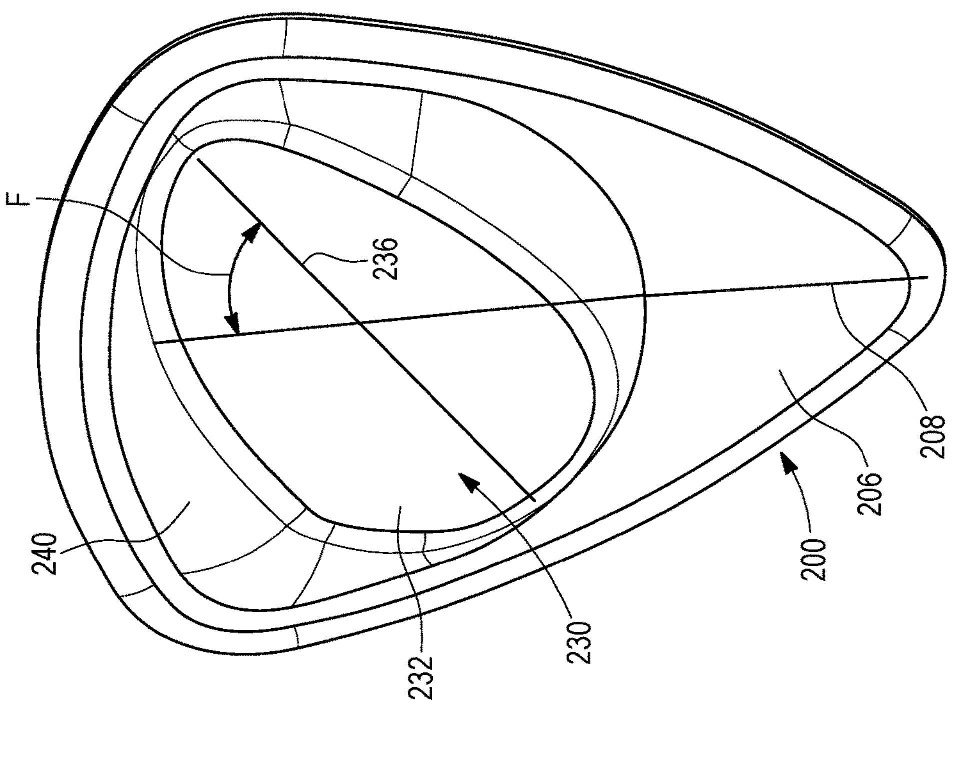
FIG. 2A is a perspective view of a finger side of an ergonomic plectrum, according to an illustrative embodiment.

FIG. 2A is a perspective view of a finger side of an ergonomic plectrum, according to an illustrative embodiment, and FIG. 2B is a perspective view of a thumb side of an ergonomic plectrum, according to an illustrative embodiment. Ergonomic plectrum 200 can have a finger side 210 adapted to be held by a finger such as the first finger, and ergonomic plectrum 200 can have a thumb side 220 adapted to be held by a thumb.

The ergonomic plectrum 200 can have cradle(s) 230 adapted to hold a finger or thumb. The cradle 230 can be a trough or a channel or a concavity that the finger or thumb can lie within. The cradle can be sized and shaped to partially embrace the finger or thumb within the cradle 230. The cradle 230 can be defined by contact surface 232, or put another way, the contact surface 232 can form the cradle 230. In various embodiments, the contact surface 230 can be curved, and can be adapted to conform to the size and shape of the finger or thumb, as well as the position and/or orientation of the finger or thumb when the finger or thumb is grasping the plectrum in a preferred position. The contact surface 232 can be adapted to partially wrap around, or partially envelop a finger or thumb The cradle 230 can be part of a raised node 240. Node 240 can extend upwards from the flat surface of a plectrum, and the cradle 230 can be a concavity or depression within the node 240. The cradle 230 can be an elongate concavity within the node, the elongate concavity having an axis along the length of the concavity. The contact surface 232 can partially define the node, or put another way, the contact surface 232 can be a portion of the exterior surface of the node 240. In various embodiments, the raised node 240 can be formed as one piece with the ergonomic plectrum 200, or put another way, the raised node 240 can be unitary with the plectrum 200. The plectrum 200 can be molded or otherwise shaped with raised node(s) 240 on one or both sides of the plectrum. In various embodiments, a node 240 can be manufactured separately and can be attached to the plectrum in a separate step. The node 240 can be made from hard materials, or can be made from resilient materials that can improve traction and conform to the finger or thumb, or can be made from a combination of materials. The materials chosen for a node can optimize the node for user preferences, which can include traction, ergonomics and comfort, as well as targeting any desired tonal attributes that result from this material selection when the plectra is used.

In various embodiments, ergonomic plectra can be manufactured in ranges of different shapes, sizes, stiffnesses, etc., incorporating current plectra technology and corresponding to current plectra sales, however, cradles can be added to one or both sides of the plectra across the wide range of different shapes, sizes, stiffnesses, etc. In this way, plectra can be sold that can match a broad range of user preferences while also providing the added benefits of finger cradles.

The contact surface 232 can engage the finger or thumb along the side of the plectrum, so that the plectrum remains in a fixed position and orientation relative to the finger or thumb. The cradle 230 can be aligned at an angle that allows the user’s finger or thumb to lie in the cradle with maximum comfort and/or grip while maintaining the plectrum in a preferred position and orientation relative to the finger and thumb. An ergonomic plectrum 200 can have a thumb side 204 and a finger side 206. The thumb side 204 can have a unique cradle adapted to accommodate a thumb, and the finger side 206 can have a unique cradle adapted to accommodate a finger. A finger cradle and a thumb cradle can be oriented at different angles to accommodate a finger on the finger side 206 and a thumb on the thumb side 204 while the user grasps the plectrum in a preferred position for contacting the strings of the instrument.

As shown in FIG. 2A a finger cradle can have a finger cradle axis 236 that can be adapted to align with, or be parallel to, the distal phalange of a user’s finger. The finger cradle axis 236 can be at an angle F to the central axis 208 of the plectrum. By way of non-limiting example, in an embodiment angle F can be approximately 50 degrees, however, as described more fully below, in various embodiments angle F can vary, and can be customized for individual users. As shown in FIG. 2B a thumb cradle can have a thumb cradle axis 234 that can be adapted to align with, or be parallel to, the distal phalange of a user's thumb. The thumb cradle axis 234 can be at an angle T to the central axis 208 of the plectrum. By way of non-limiting example, in an embodiment angle T can be approximately 90 degrees, however, as described more fully below, in various embodiments angle T can vary, and can be customized for individual users. In various embodiments, the contact surface can be curved around the cradle axis.

Figure 3A:
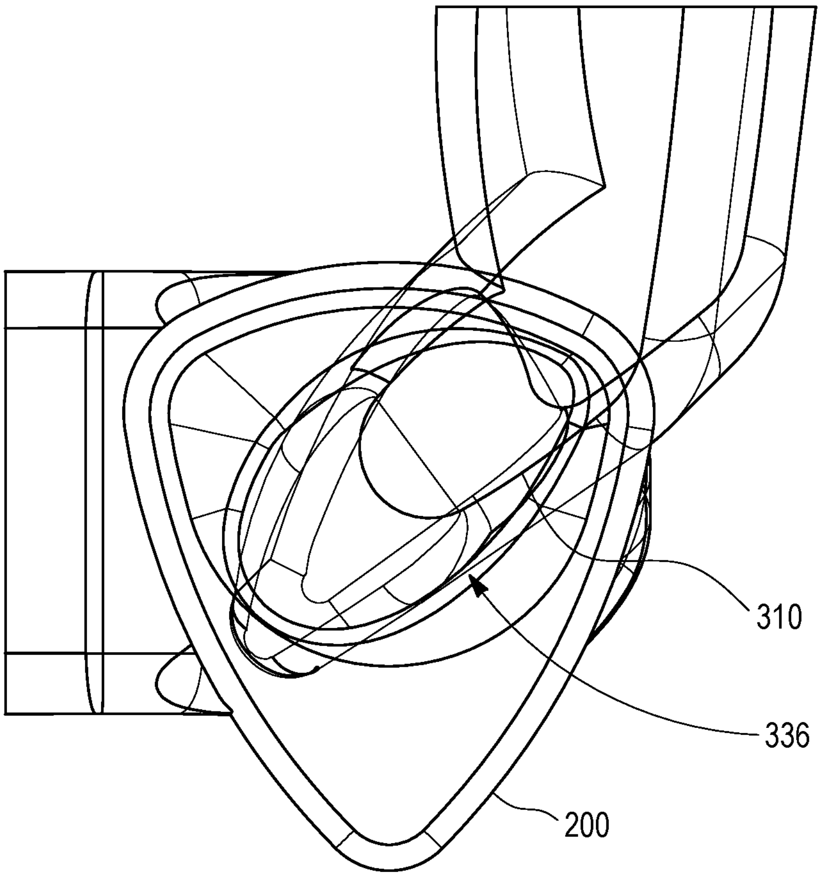
FIG. 3A is a perspective view of an ergonomic plectrum with a finger (shown in phantom) engaging with a finger cradle, according to an illustrative embodiment.
Figure 3B:
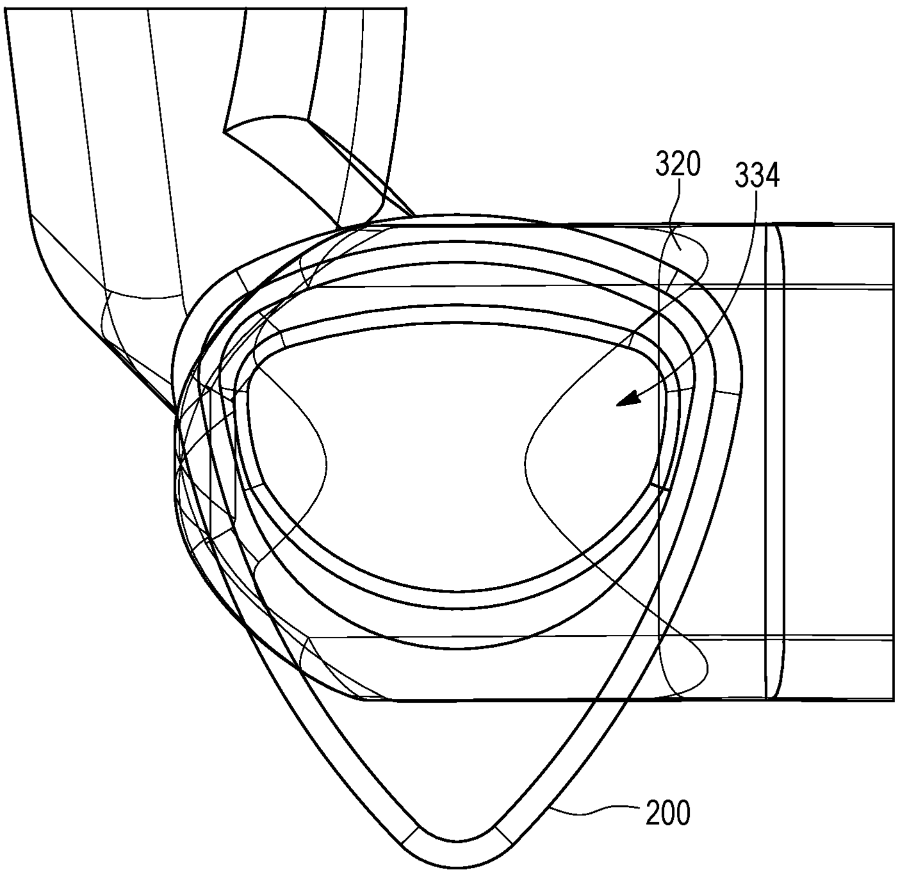
FIG. 3B is a perspective view of an ergonomic plectrum with a thumb (shown in phantom) engaging with a thumb cradle, according to an illustrative embodiment.

FIG. 3A is a perspective view of an ergonomic plectrum 200 with a finger 310 (shown in phantom) engaging with a finger cradle 336, according to an illustrative embodiment, and FIG. 3B is a perspective view of an ergonomic plectrum 200 with a thumb 320 (shown in phantom) engaging with a thumb cradle 334, according to an illustrative embodiment. Finger cradle 336 is sized, shaped, and oriented to accommodate a finger while the finger is in a preferred posture for holding a plectrum to contact the strings of a stringed instrument. Thumb cradle 334 is sized, shaped, and oriented to accommodate a thumb while the thumb is in a preferred posture for holding a plectrum to contact the strings of a stringed instrument. Finger cradle 336 and thumb cradle 334 can be adapted to work together, so that together they accommodate the finger and thumb when the finger and thumb are in a preferred posture for holding a plectrum to contact the strings of a stringed instrument. The engagement of the finger 310 and thumb 320 within the cradles 334 and 336 results in the ergonomic plectrum 200 being maintained in a fixed position and fixed orientation relative to the finger and thumb. The contact surfaces 232 of the two cradles maintain contact with the finger and thumb, and thereby hold the plectrum in place relative to the finger and thumb. The ergonomic plectrum 200 is prevented from rotating or slipping relative to the user.

The ergonomic plectrum 200 can provide benefits to experienced players and to novice players, both. All players can benefit from the increased comfort provided by the ergonomic plectrum, and because the ergonomic plectrum 200 is much easier to grip and maintain in the preferred position and orientation, the plectrum requires significantly less force to pinch and hold in place, resulting in decreased fatigue for the user. Furthermore, novice players benefit not only from the comfort and decreased fatigue, but also benefit from having the plectrum maintained in the fixed position and orientation. As a player is learning a new instrument, it is beneficial to remove any unnecessary variables, such as the position and orientation of a traditional plectrum that can shift within the fingers while playing. This problem is exacerbated by the novice user having underdeveloped hand muscles that are more likely to allow the plectrum to move relative to the finger and thumb, and more likely to develop fatigue that further compounds the problem as the hand gets more tired and the plectrum harder and harder to hold in the desired position and orientation. The ergonomic plectrum 200 overcomes these problems by maintaining the plectrum in the preferred position and orientation with minimal pinch force exerted by the user.

Furthermore, the novice player benefits from training and learning how to hold the pick properly, including how to orient and position the finger and thumb relative to each other. Because the ergonomic plectrum 200 holds the user's thumb, the user's finger, and the plectrum all in a fixed position and orientation, the novice player begins to form muscle memory regarding the preferred position and orientation of the finger, thumb, and plectrum, and in the future, the user will be more able to properly hold a traditional flat plectrum without having to think about the plectrum as a separate variable. The ergonomic plectrum with cradles in raised nodes helps the novice user to learn how to hold any plectrum, including traditional flat plectrum, properly and do so more easily.

In various embodiments, different ergonomic plectra can have different sized and/or shaped cradles, so that different plectra can accommodate different preferred methods of gripping the picks. The different plectra can have contact surfaces with different shapes and contours. These various plectra can accommodate the preferences of different users, along with accommodating the physical sizes and dimensions of different users. Variations among different plectra can allow for different plectra that are optimized for different users, different user preferences, different ways a user might engage a plectrum, etc. Numerous parameters of the plectra can be adapted so that each individual user can have a plectra that is well-suited to that user. In various embodiments, the adaptable parameters can include the size and/or shape of the cradle, the curvature of the contact surface, the angles at which the fingers and/or thumb engage with the plectrum, also referred to herein as the attack position or the angle of attack, the portion of the finger/knuckle/phalange that engages with the plectrum, and various other parameters.

Figure 4:
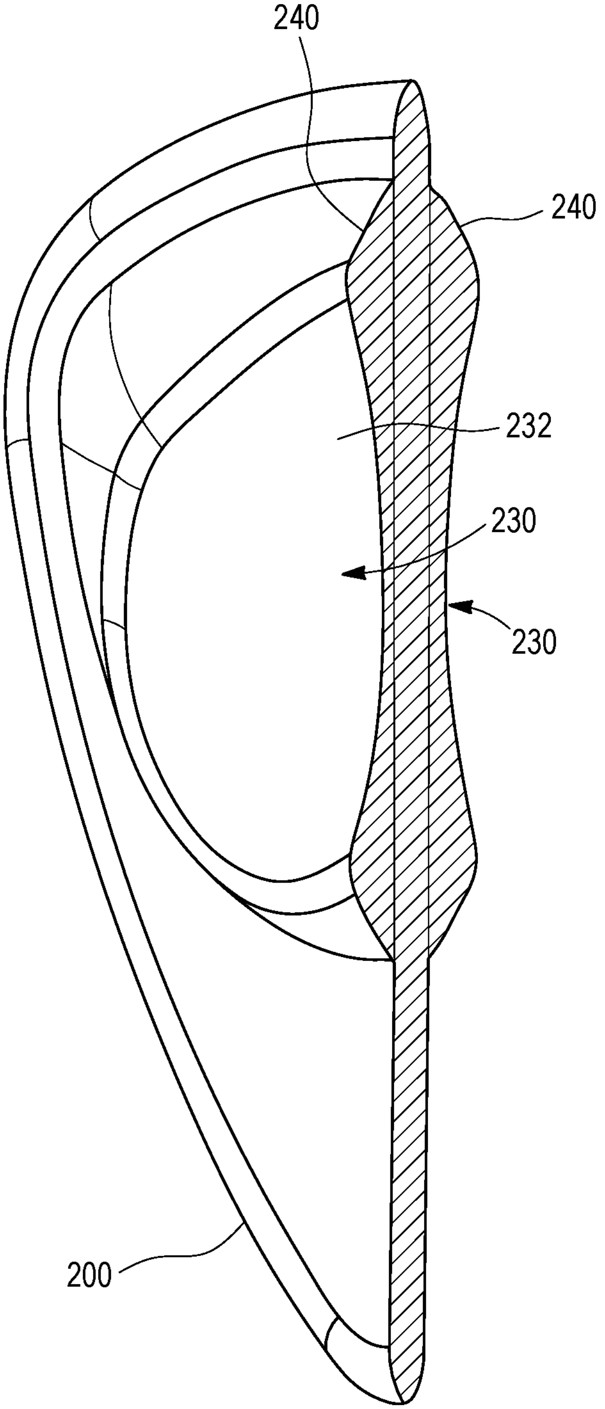
FIG. 4 is a cross-section of an ergonomic plectrum, taken along central axis 208 of FIG. 2A, according to an illustrative embodiment.

FIG. 4 is a cross-section of an ergonomic plectrum, taken along central axis 208 of FIG. 2A, according to an illustrative embodiment. An ergonomic plectrum 200 can have raised nodes 240 on one or both sides of the plectrum. Raised nodes 240 can be unitary with the plectrum or can be added to the plectrum separately. Raised nodes 240 can have cradles 230 that can be concavities or depressions within the nodes 240. The cradle 230 can be defined by contact surface 232. In various embodiments, the contact surface 232 can be raised up from the plectrum, and the plectrum can have an underlying plectrum base that occupies the same space as a traditional flat plectrum. That is to say, in various embodiments a traditional flat plectrum can fit within the ergonomic plectrum, or a portion of the ergonomic plectrum can overlay the space occupied by a traditional flat plectrum, or the ergonomic plectrum can include a traditional flat planar plectrum with raised nodes on one or both sides.

Figure 1A:
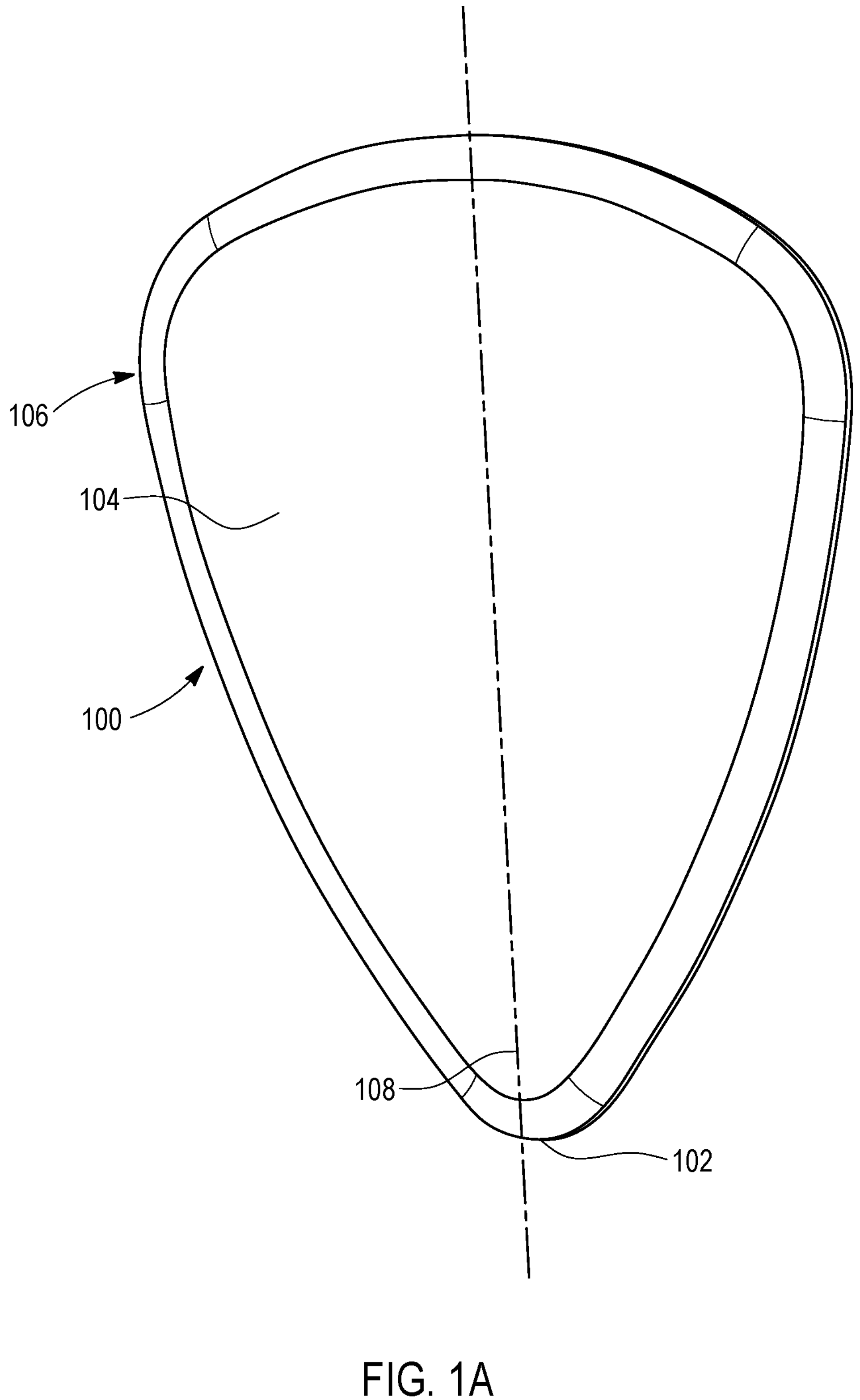
FIG. 1A, previously described, is a perspective view of a traditional, prior art plectrum, according to an illustrative embodiment.
Figure 1B:
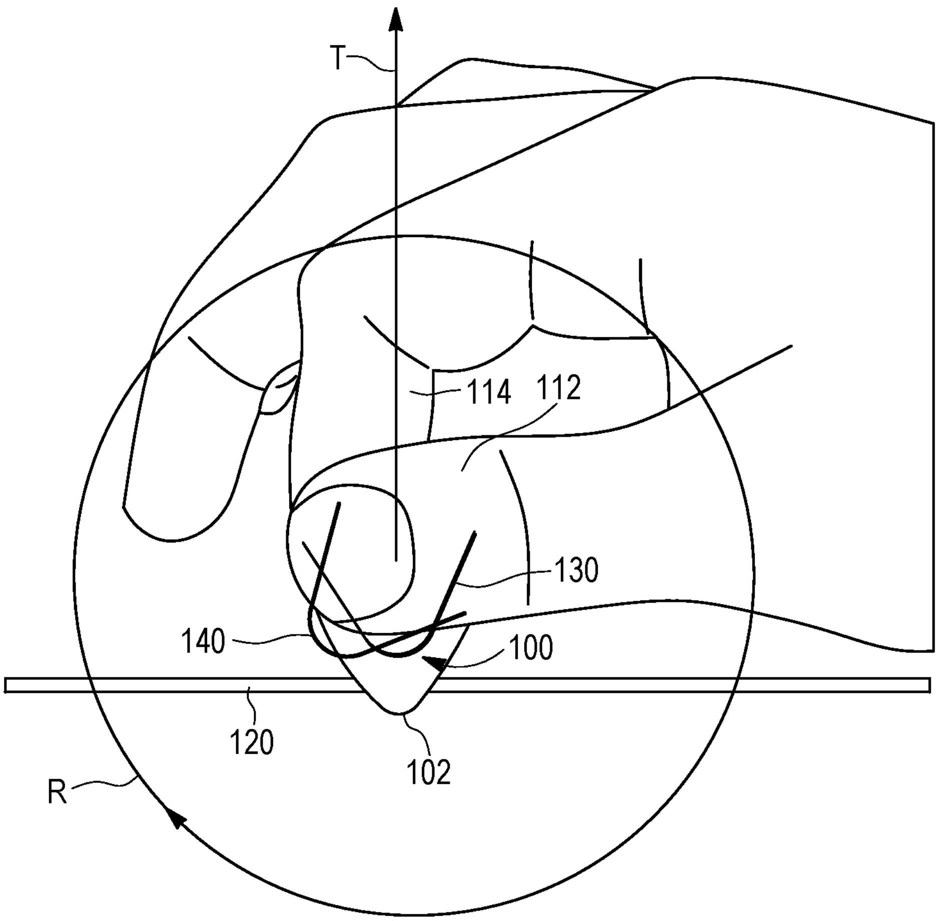
FIG. 1B, previously described, is a perspective view of a traditional, prior art plectrum being gripped between a thumb and index finger, according to an illustrative embodiment.

As shown in FIG. 4, the ergonomic plectrum can be a flat, planar object with nodes that extend outwards from the flat, planar plectrum. Because the underlying plectrum can be flat and planar, a novice user can use the ergonomic plectrum in a way that can be compared to the use of training wheels to learn how to ride a bicycle. The raised nodes and cradles help the novice user learn how to hold and use the underlying plectrum, and after learning to hold the ergonomic plectrum, that user can use a traditional flat plectrum more easily and more comfortably. In various embodiments, the ergonomic plectrum 200 can include a plectrum base that can be the same as a traditional flat, planar plectrum such as plectrum 100 as shown in FIG. 1.

Figure 5A:
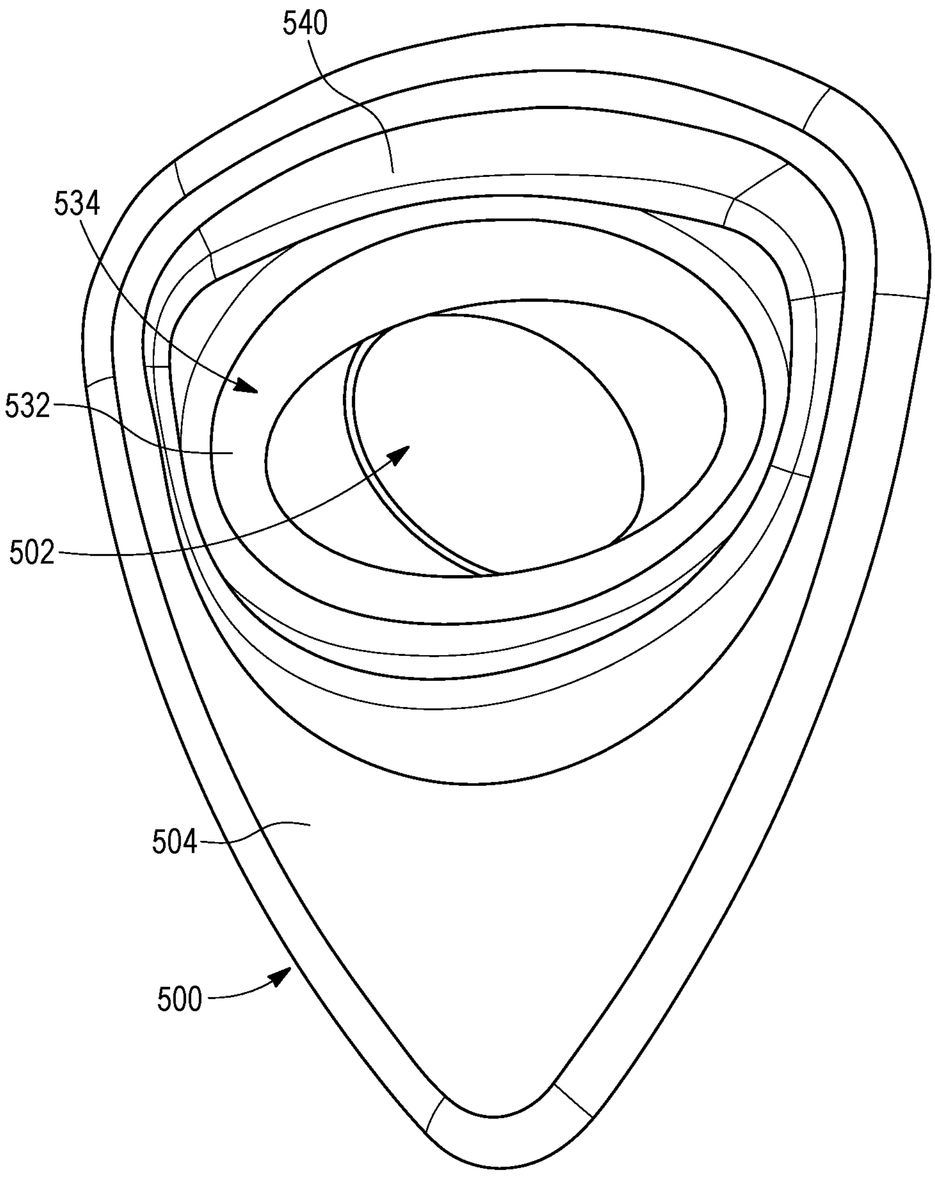
FIG. 5A is a perspective view of a thumb side of an ergonomic plectrum with a central opening, according to an illustrative embodiment.
Figure 5B:
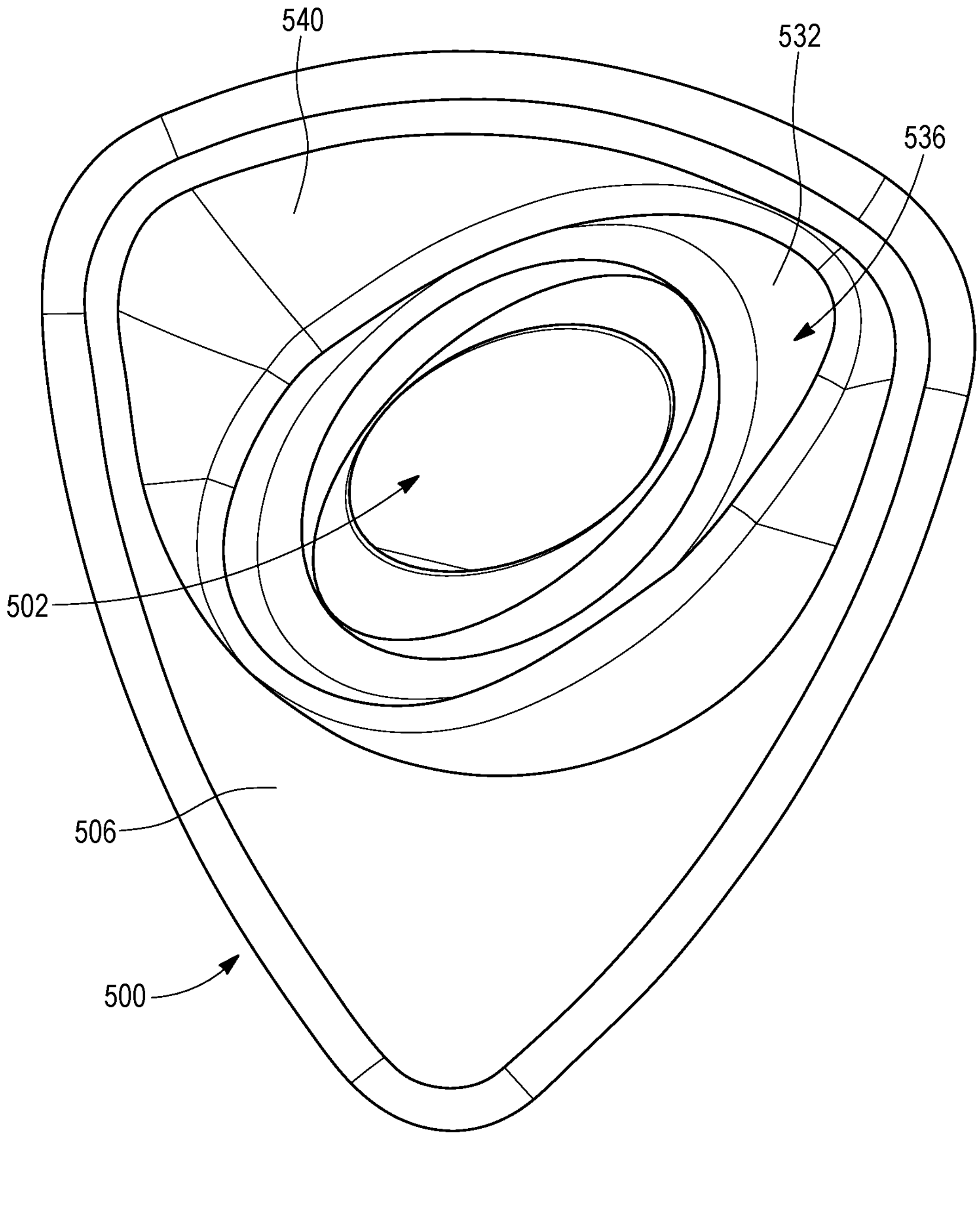
FIG. 5B is a perspective view of a finger side of an ergonomic plectrum with a central opening, according to an illustrative embodiment.

FIG. 5A is a perspective view of a thumb side of an ergonomic plectrum with a central opening, according to an illustrative embodiment, and FIG. 5B is a perspective view of a finger side of an ergonomic plectrum with a central opening, according to an illustrative embodiment. In various embodiments, an ergonomic plectrum 500 can have a central opening 502 that extends through the plectrum from a first side 504 to a second side 506. This central opening 502 can pass through both contact surfaces 532 and both nodes 540, and can allow the user's finger and thumb to contact each other while gripping the ergonomic plectrum. Put another way, the thumb cradle 534 and the finger cradle 536 can overlap or intersect. The user's finger and thumb can be in contact with each other through the central opening when the user grips the plectrum. For some users, this central opening, and the ability to touch the finger to the thumb, can improve the ergonomics, and can increase the ease with which a user can secure the position and orientation of the pick.

Figure 6A:
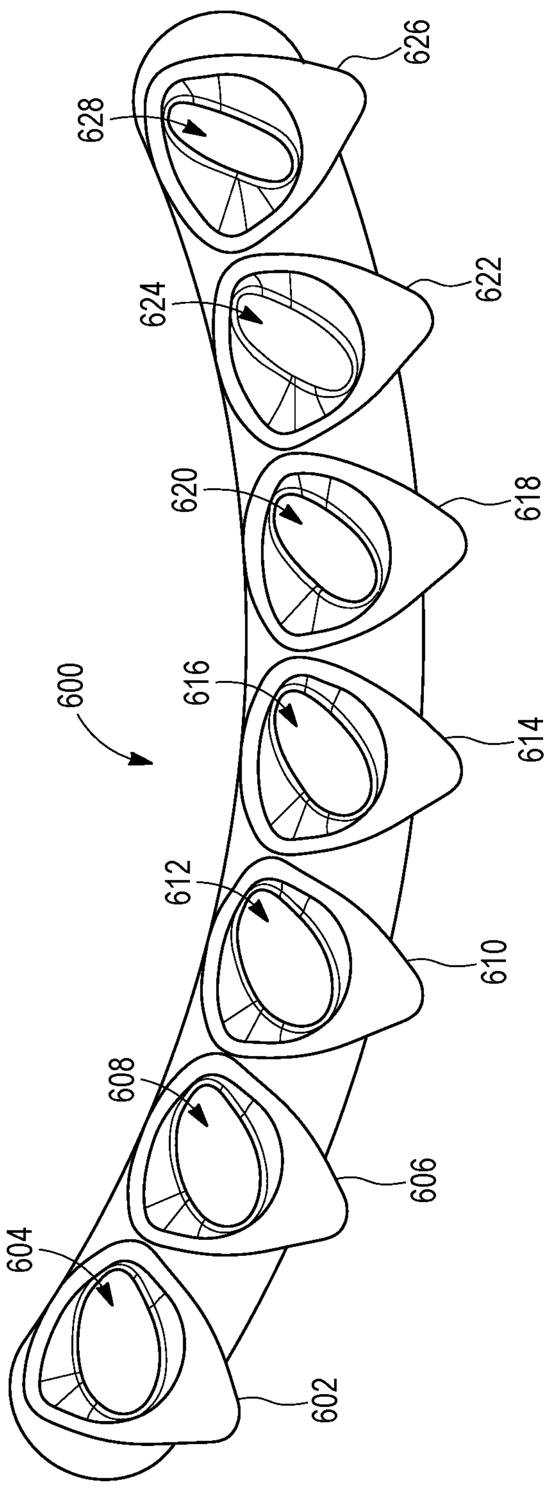
FIG. 6A is a perspective view of a sizing/testing tool for determining finger size, according to an illustrative embodiment.

FIG. 6A is a perspective view of a testing tool for determining finger size, according to an illustrative embodiment. Testing tool 600 has an array of different sizes of cradles 230, and can be used to help a user determine the best size cradle for that user. In the embodiment shown in FIG. 6A, there are seven plectra, 602, 606, 610, 614, 618, 622, and 626, each with a different sized cradle, 604, 608, 612, 616, 620, 624, and 628, and a user can grasp each of the different plectra and thereby determine which of the cradle sizes is best for that user. In various embodiments, different numbers of cradle sizes are possible. Various embodiments of systems for measuring the ideal cradle size are possible. In an embodiment, a single tool can have different integral cradles arrayed on the same tool, with the largest cradle on one end and the cradles arranged in order of descending size. In an embodiment, a system for measuring the ideal cradle size can include several distinct independent plectra, each of which can be grasped separately so the user can get a real-life feel for the different plectra with different sized cradles. In various embodiments, a system for determining an ideal cradle size based on a user's finger size can allow the user to try placing the user's finger in various different cradles until the ideal size is found.

Figure 6B:
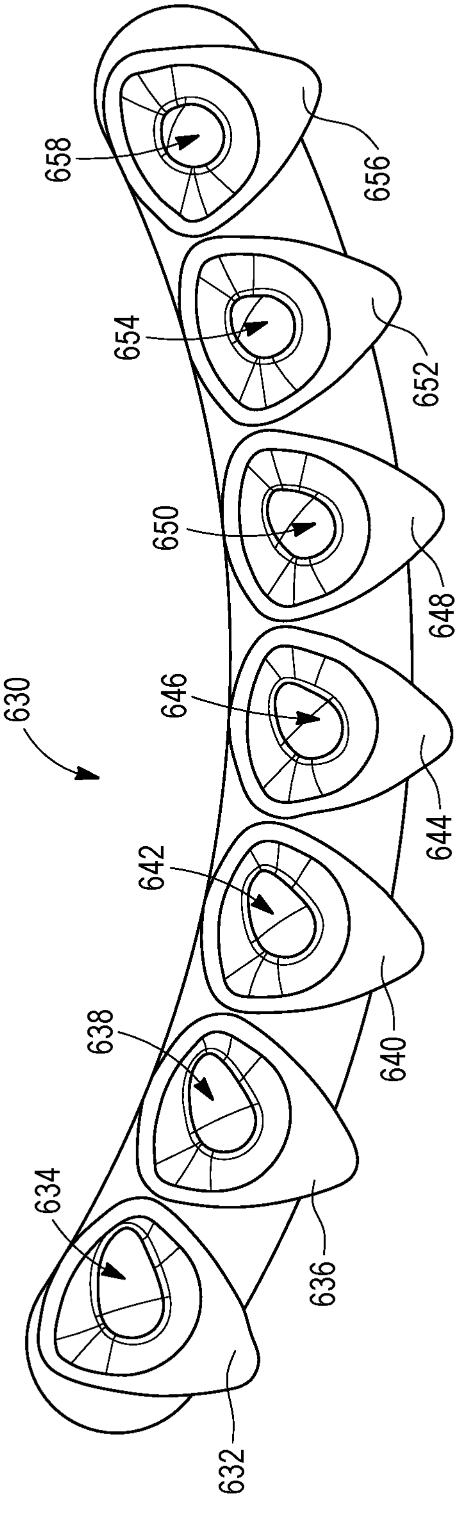
FIG. 6B is a perspective view of a testing tool for determining a preferred finger angle of attack, according to an illustrative embodiment.

FIG. 6B is a perspective view of a testing tool for determining a preferred finger angle of attack, according to an illustrative embodiment. The phrase "angle of attack" can describe how perpendicular the finger is to the pick, or put another way, how steeply the finger tip engages the pick, or the angle at which the fingertip points into the pick. The terms "angle of attack" and "attack position" can be used interchangeably as described herein. Testing tool 630, as shown, is one example of a testing tool for determining an angle of attack however, in various embodiments, in may be beneficial to have a number of different angle of attack testing tools similar to the one shown in FIG. 6B for identifying the preferred angle of attack. By way of non-limiting example, it may be beneficial to have a different angle of attack tool, similar to the one in FIG. 6B, for each of the different cradle size nodes on the size tool of in FIG. 6A. A user can first determine a preferred cradle size using the size testing tool shown in FIG. 6A, and then the user can find an angle of attack determining tool that has cradle sizes corresponding to the cradle size that was already identified by the user using the size tool. A user may want an angle of attack tool that has the preferred cradle size on the angle of attack determining tool when determining the preferred angle of attack in order to determine the angle most effectively.

Testing tool 630 has an array of different cradles 230, and can be used to help a user determine the preferred angle of attack for that user. In the embodiment shown in FIG. 6B, there are seven plectra, 632, 636, 640, 644, 648, 652, and 656, each with a different cradle adapted for a different angle of attack, 634, 638, 642, 646, 650, 654, and 658, and a user can grasp each of the different plectra and thereby determine which of the different angles of attack is best for that user. As shown in the example in FIG. 6B, plectra 632 has a cradle 634 that is shaped for a more flat angle of attack, adapted for a user who prefers to lay his finger more parallel along the side of the plectrum, and at the other end of the spectrum plectra 656 has a cradle 658 that is shaped for a steeper angle of attack, adapted for a user who prefers to point his finger more perpendicular into the plectrum. In various embodiments, different numbers of plectra along the spectrum of angles of attack are possible. Various embodiments of systems for measuring the ideal angle of attack are possible. In an embodiment, a single tool can have different integral cradles arrayed on the same tool, with the most parallel cradle on one end and the cradles arranged in order of increasing angle of attack. In an embodiment, a system for measuring the ideal angle of attack can include several distinct independent plectra, each of which can be grasped separately so the user can get a real-life feel for the different plectra adapted for users who prefer different angles of attack. In various embodiments, a system for determining an ideal cradle shape based on a user's preferred finger angle of attack can allow the user to try placing the user's finger in various different cradles until the ideal shape is found.

Figure 6C:
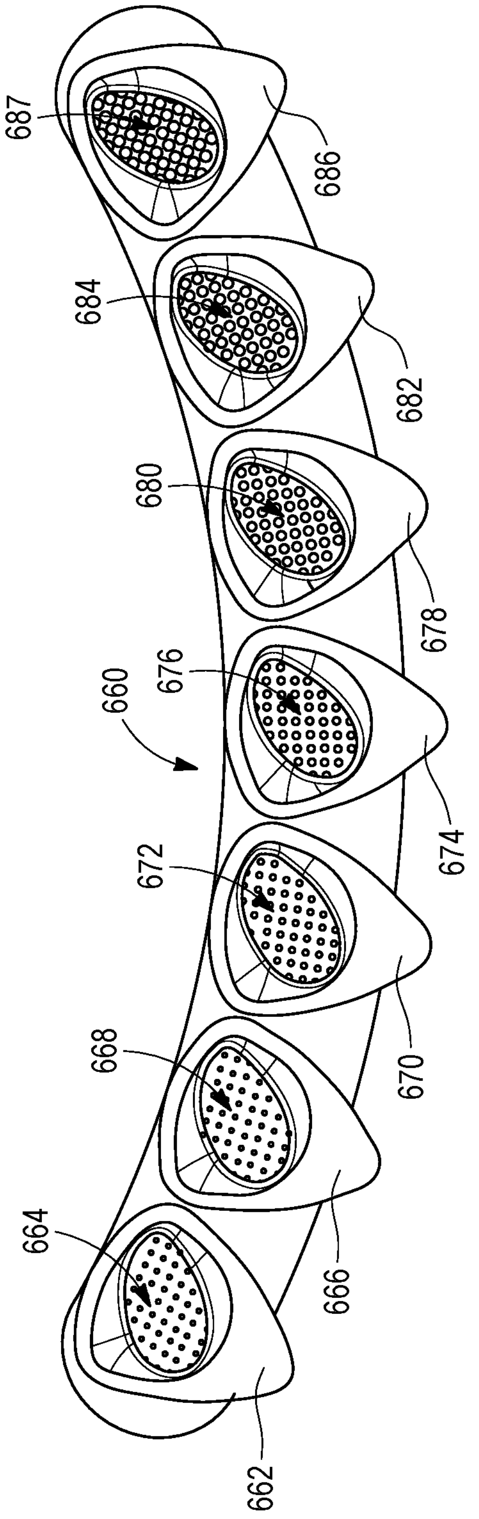
FIG. 6C is a perspective view of a testing tool for determining a preferred cradle texture, according to an illustrative embodiment.

FIG. 6C is a perspective view of a testing tool for determining a preferred cradle texture, according to an illustrative embodiment. In various embodiments, the contact surface of the cradle can vary from nearly smooth to coarse like sandpaper, and the testing tool 660 can help a user to determine a preferred texture. Testing tool 660 can have an array of different cradles 230 with different textured contact surfaces, and testing tool 660 can be used to help a user determine the preferred texture of contact surface 232 for that user. In the embodiment shown in FIG. 6C, there are seven plectra, 662, 666, 670, 674, 678, 682, and 686, each with a different texture of contact surface within the cradle, 664, 668, 672, 676, 680, 684, and 687, and a user can grasp each of the different plectra and thereby determine which of the different textures is best for that user. As shown in the example in FIG. 6C, plectra 662 has a cradle 664 that is more smooth, and at the other end of the spectrum plectra 686 has a cradle 687 that is much more coarsely textured. In various embodiments, different numbers of plectra along the spectrum of textures are possible. Various embodiments of systems for measuring the ideal texture are possible. In an embodiment, a single tool can have different integral cradles arrayed on the same tool, with the smoothest contact surface cradle on one end and the cradles arranged in order of increasing coarseness of contact surface. In an embodiment, a system for measuring the ideal texture can include several distinct independent plectra, each of which can be grasped separately so the user can get a real-life feel for the different plectra adapted for users who prefer different textures. In various embodiments, a system for determining an ideal texture based on a user's preference can allow the user to try placing the user's finger in various different cradles until the ideal texture is found.

Similar to the above, in various embodiments, a system for determining an ideal plectrum for a particular user can include finding the preferred size/shape/attack-position finger cradle, the preferred size/shape/attack-position thumb cradle, the preferred angle of the finger cradle, the preferred angle of the thumb cradle, the preferred cradle-texture, the preferred durometer hardness of the plectrum, the preferred plectrum material, the preferred plectrum thickness, etc. For each of the various parameters listed above, a user can try various options that can be arranged in a range, such as a range of plectrum hardness from hardest to softest, or a range of cradle angles, cradle sizes, etc. In various embodiments, the system presented herein allows a user to fully customize a preferred ergonomic plectrum. In various embodiments a user can grasp the different plectra across the range for that parameter and can play an instrument while trying different plectra. A user can experiment by adjusting a single parameter, one at a time, to determine the user's preferred specification for each parameter. After determining a preferred specification for each parameter, the user can easily identify the user's ideal plectrum. This system for determining an ideal plectrum facilitates the selection process to converge on an ideal fully customized plectrum across a number of parameters.

Figure 6D:
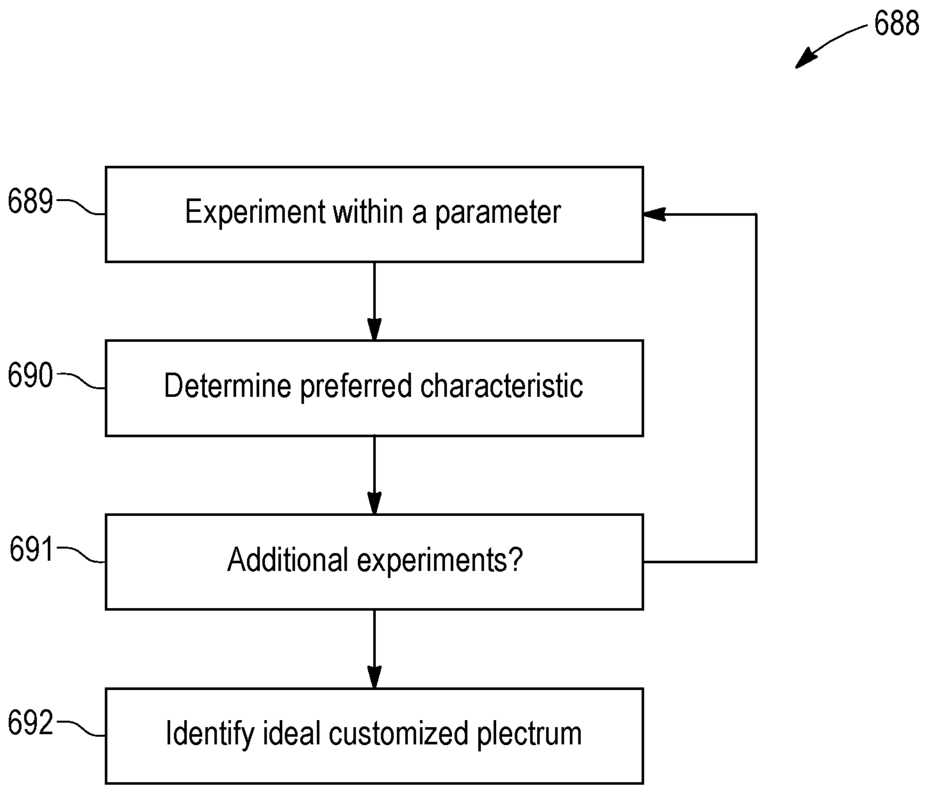
FIG. 6D is a chart showing a method for identifying a preferred customized plectrum, according to an illustrative embodiment.

FIG. 6D is a chart showing a method for identifying a preferred customized plectrum, according to an illustrative embodiment. The method 688 for identifying a preferred customized plectrum can include identifying a number of preferences, however, it should be clear that many of the individual preferences can be identified in any order. Identifying a preferred customized plectrum can include identifying a preferred characteristic across each of a number of different parameters. In various embodiments, the different parameters for plectra can include the size/shape of the finger cradle, the preferred size/shape of the thumb cradle, the preferred angle of the finger cradle, the preferred angle of the thumb cradle, the preferred cradle-texture, the preferred stiffness of the plectrum, the resilience or hardness of the nodes, the preferred plectrum material, and the preferred plectrum thickness. At box 689, a user can use a testing tool such as testing tool 600, 630, 660 and/or testing tool 700, explained more fully below, to experiment with a number of different characteristics across a parameter. By way of non-limiting example, one parameter can be finger cradle size and the different characteristics can be different sizes of finger cradles. The user can experiment with different finger cradle sizes (different characteristics) across the finger cradle size parameter to determine the preferred finger cradle size (preferred characteristic in that parameter). At box 690, the user can identify the preferred characteristic for that parameter. By way of non-limiting example, the preferred characteristic can be the preferred finger cradle size. At box 691, the user can determine if an additional parameter should be evaluated. If the user wishes to evaluate an additional parameter, such as, for example, thumb cradle size, the user can return to box 689. If the user determines that no further parameters should be evaluated, the user can proceed to box 692. At box 692, the user can identify the ideal customized plectrum, wherein the ideal customized plectrum has characteristics that correspond to each of the preferred characteristics identified at box 690.

Figure 6E:
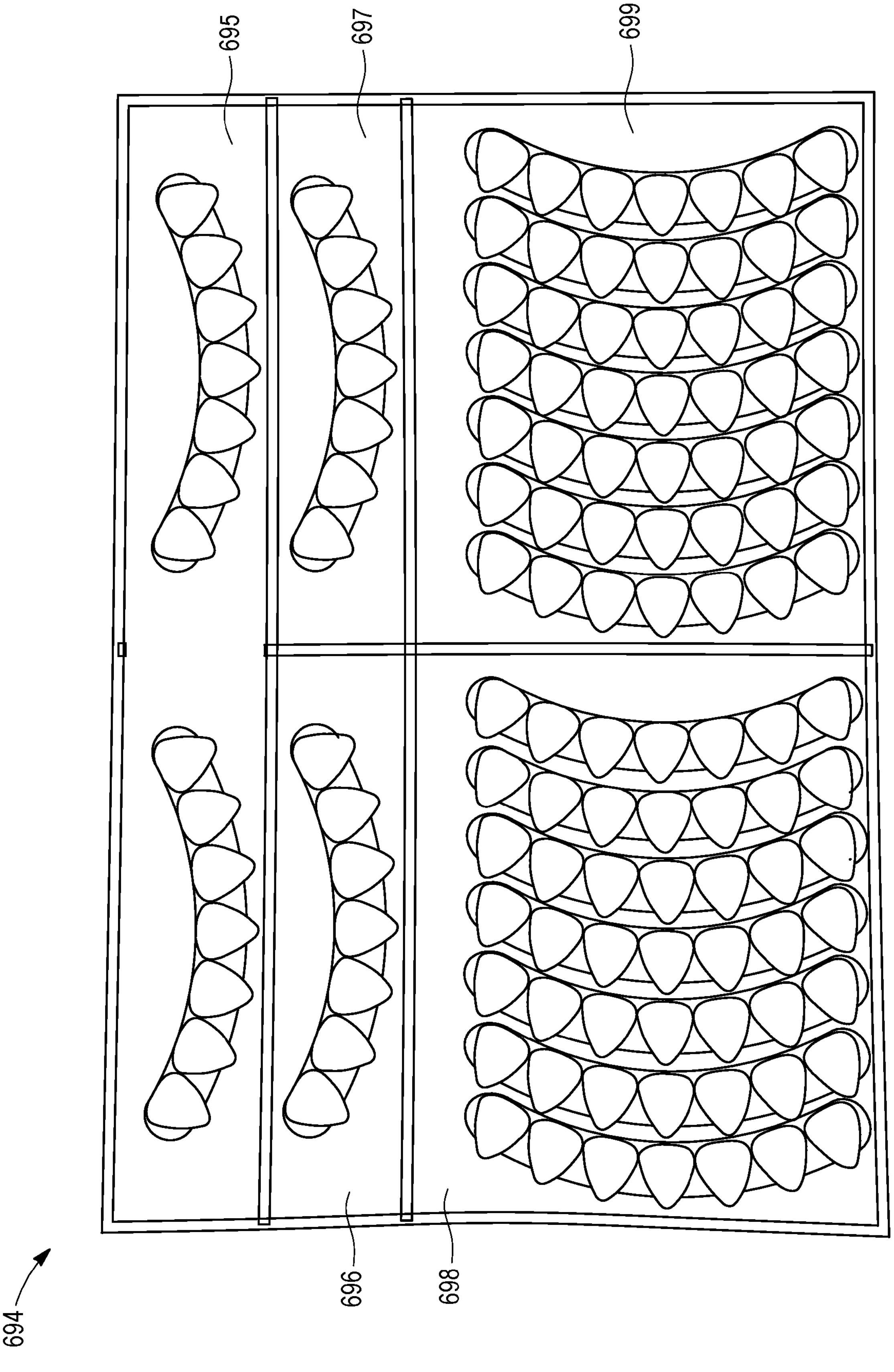
FIG. 6E is a schematic view of a kit with various testing tools, according to an illustrative embodiment.

FIG. 6E is a schematic view of a testing kit with various testing tools, according to an exemplary embodiment. Testing kit 694 can include an assortment of testing tools that can help a user identify the various preferred characteristics. Section 695 can include one testing tool to help identify a preferred texture and one testing tool to help identify a preferred durometer or elasticity. The texture parameter and the durometer/elasticity parameter are not heavily dependent on the user's anatomy. Because the ideal characteristic across these parameters is not heavily dependent on the user's anatomy, the preferred characteristics can be found without the need for the testing tools to have a number of different cradle sizes for each characteristic. The preferred characteristic can even be found using the same tool for finger and for thumb. In various embodiments, the same tool can be held first with the finger on the testing node and then with the thumb on the testing node, or in various embodiments, the tool can have the same testing surface on both sides of the tool. This allows various embodiments of the testing kit to have only a single version of each of these non-anatomy dependent tools, thereby significantly reducing the number of testing tools present in the kit. Non-anatomy dependent testing tools can include, but are not limited to, texture, durometer/elasticity, plectra hardness, plectra thickness, and/or various other parameters. However, it should be clear that in various embodiments, multiple versions of non-anatomy dependent testing tools having different size cradles, different finger or thumb cradles, etc. are possible despite the resulting increase in size of the kit.

Box 696 can have a finger cradle size testing tool, and box 697 can have a thumb cradle size testing tool. The preferred finger cradle size can be determined separately from the preferred thumb cradle size, and visa versa. After determining the preferred finger cradle size, box 698 can have a number of finger attack position testing tools. As shown in FIG. 6E, box 698 can have one finger attack position testing tool for each finger cradle size on the finger cradle size testing tool. In the example shown in FIG. 6E, the finger cradle size tool has seven different finger cradle sizes, and so box 698 can have seven finger angle of attack position testing tools, with each different angle of attack tool having nodes with sizes that correspond to one of the sizes on the size testing tool. One angle of attack testing tool can exist for each size on the size testing tool.

Similarly, after determining the preferred thumb cradle size, box 699 can have a number of thumb attack position testing tools. As shown in FIG. 6E, box 699 can have one thumb attack position testing tool for each thumb cradle size on the thumb cradle size testing tool. In the example shown in FIG. 6E, the thumb cradle size tool has seven different thumb cradle sizes, and so box 699 can have seven thumb angle of attack position testing tools, with each different angle of attack tool having nodes with sizes that correspond to one of the sizes on the size testing tool. One angle of attack testing tool can exist for each size on the size testing tool.

Figure 7A:
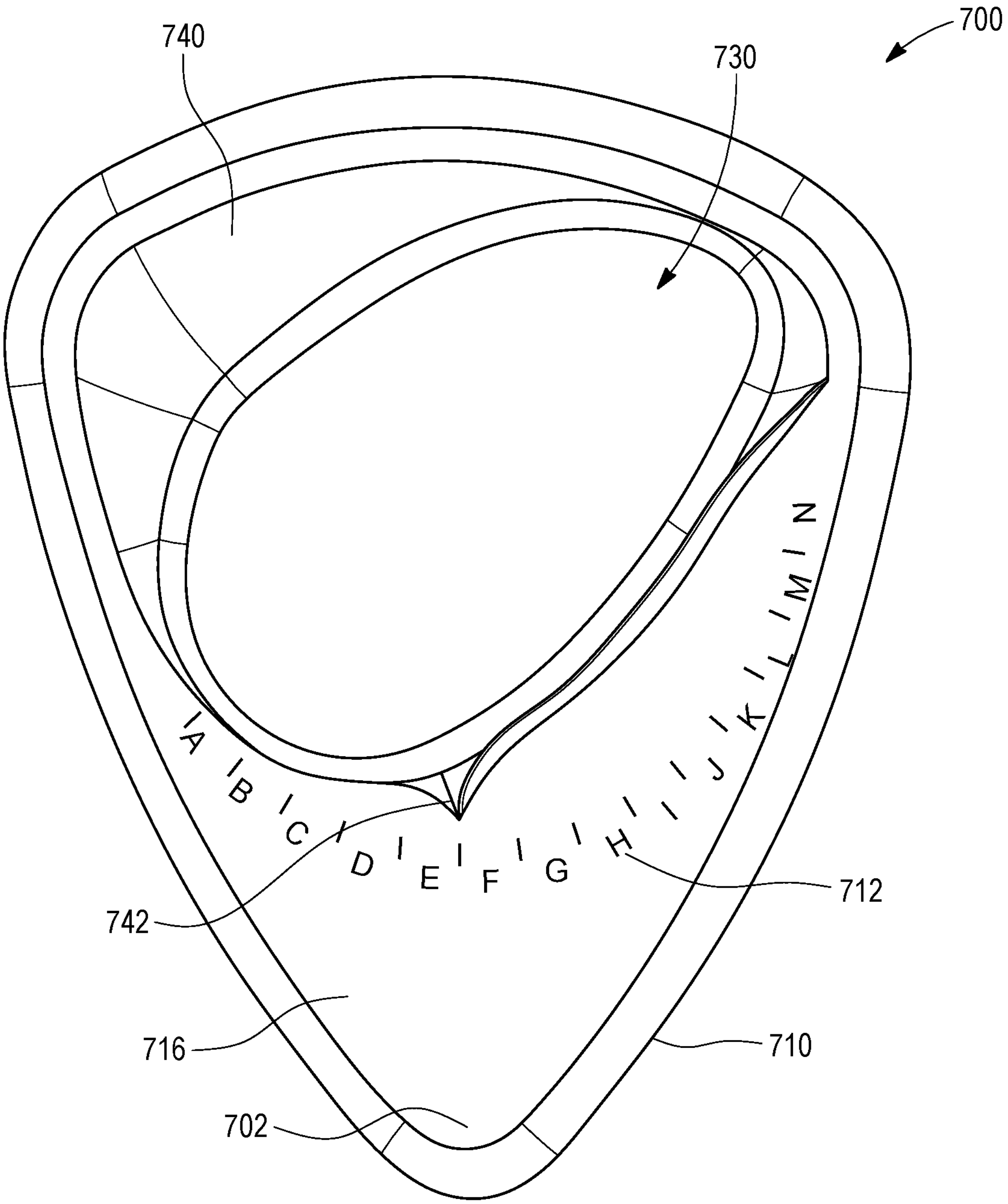
FIG. 7A is a perspective view of a cradle angle tool for determining the optimal angles of the finger cradle and the thumb cradle, according to an illustrative embodiment.

FIG. 7A is a perspective view of a cradle angle tool for determining the optimal angles of the finger cradle and the thumb cradle, according to an illustrative embodiment. A cradle angle tool 700 can be used to measure the preferred angle for one or both cradles. The cradle angle tool 700 can have a rotating node 740 with a cradle 730, and the rotating node 740 and cradle 730 can spin relative to the base 710. In various embodiments, the cradle angle tool 700 can have two rotating nodes, one on each side. The cradle angle tool can have a first rotating node and cradle adapted for a thumb on a first side, and a second rotating node 740 and cradle 730 adapted for a finger on a second side 716. The rotating node can have a pointer 742, and the base 710 can have a series of rotational angle indicators 712. In an embodiment, the rotational angle indicators can indicate measured angles in degrees. In an embodiment, the rotational angle indicators can indicate specific predetermined cradle angles that can be identified by letters, numbers, symbols, etc. By way of non-limiting example, a user can use the tool 700 to determine that the user prefers a finger cradle angle "E," and then that user can obtain customized plectra with finger cradle angle "E" for a preferred experience. Although the measured angle in degrees can be known to the manufacturer, the user only needs to know the letter that corresponds to that user's preferred predetermined angle. In various embodiments, the predetermined cradle angles can be identified with lowercase letters on a first side and uppercase letters on a second side, or various combinations of lowercase letters, uppercase letters, Roman numerals, Arabic numerals, etc. In this way, the angle indicators for the thumb cradle can be different from the angle indicators for the non-thumb finger cradle.

In an embodiment, a user can determine preferred cradle angle(s) by grasping the plectrum between thumb and finger, with the thumb and finger within the cradles on each side. The user can allow the rotating nodes 740 to rotate by gripping the tool 700 gently. The user can hold the tool 700 in that user's preferred holding style, and the nodes can rotate to allow the user's fingers to be in the optimal position and orientation for that user's anatomy and preferred holding style. The base 710 itself can spin freely with respect to the two rotating nodes 740, so that the orientation of the strike zone 702 can also be optimized relative to the fingers. Each of the rotating nodes 740 can have a pointer 742, and the pointer 742 can indicate the preferred cradle angle by pointing to rotational angle indicators 712. After the user has grasped the tool with the finger, thumb, and strike zone all in the preferred position and orientation, the ideal cradle angles for the finger cradle and the thumb cradle can be identified by the pointers 742 pointing to the preferred cradle angle indicators 712.

Figure 7B:
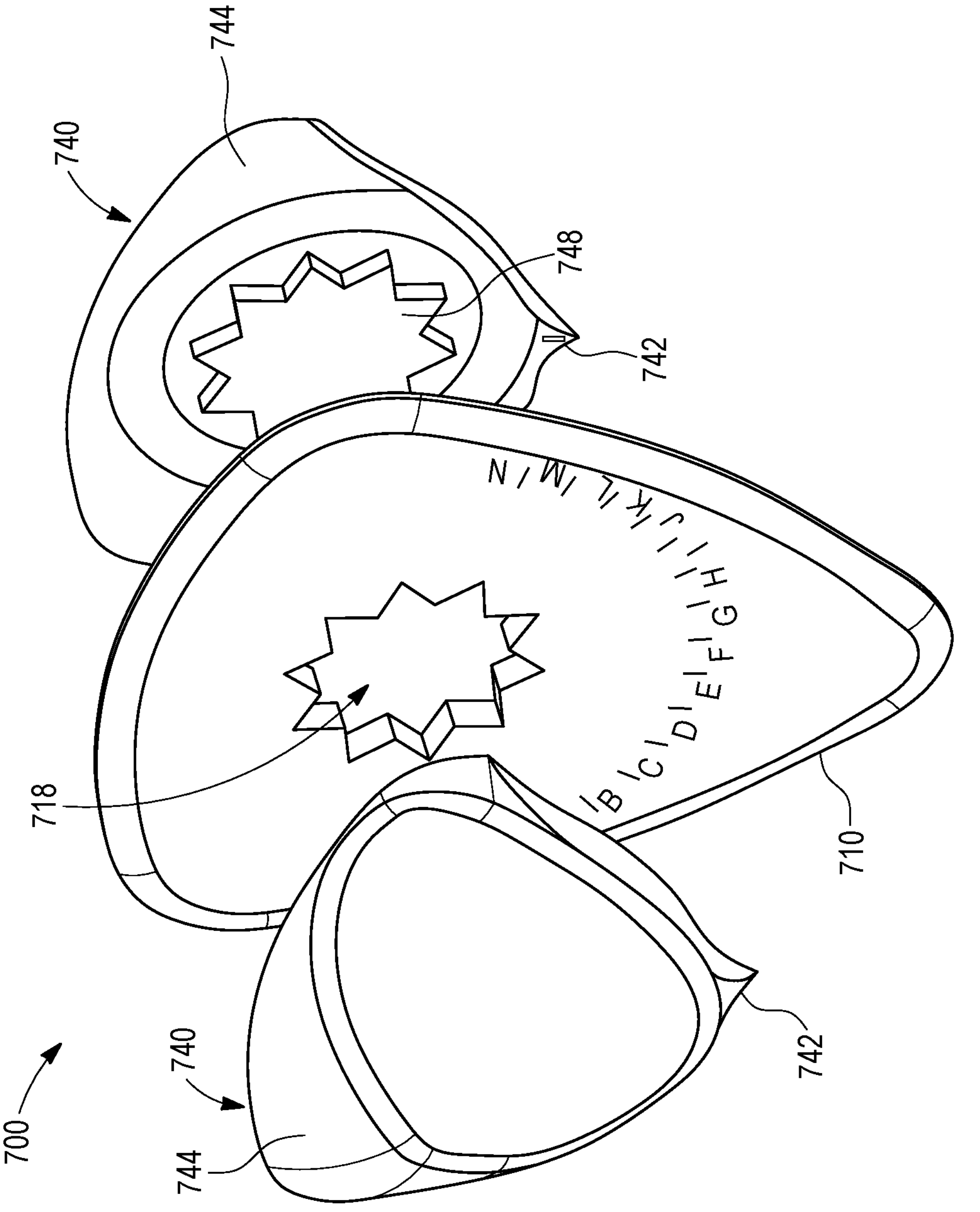
FIG. 7B is an exploded view of a cradle angle tool for determining the optimal angles of the finger cradle and the thumb cradle, according to an illustrative embodiment.

FIG. 7B is an exploded view of a cradle angle tool 700 for determining the optimal angles of the non-thumb finger cradle and the thumb cradle, according to an illustrative embodiment. In various embodiments, the base 710 can have a keyed hole 718, and each of the rotational nodes 740 can have a keyed axle 748. The keyed axle can be on the back, or non-cradle side of the node. The keyed axles 748 and the keyed hole 718 are sized and shaped so that the axles nest securely within the hole 718, and the shape of the hole and axles prevents the axles from rotating within the hole. In various embodiments, the hole and axles can be star shaped, square, triangular, tear-drop shaped, or various other shapes that prevent rotational movement of the axle relative to the base. In various embodiments, each axle can occupy half, or less than half, of the area of the keyed hole, so that the two axles can exist next to each other and each axle can extend through the entire base while remaining in a fixed position and orientation relative to the base and each other. In various embodiments, a keyed axle can occupy half or less than half of the depth of a keyhole, so that the two keyed axles can exist together in the base while remaining in a fixed position and orientation relative to the base and each other.

The rotational nodes 740 can have a node body 744 that rotates freely relative to the keyed axle 748. The tool 700 can have two rotating nodes 740, and each of them can have an axle shape that secures the axle within the base 710, so that the base 710 and two axles 748 remain rotationally locked together while the node bodies 744 can rotate freely relative to the base 710. Each node body 744 can rotate relative to the base 710 so that the pointer 742 can indicate the preferred cradle angle.

Figure 7C:
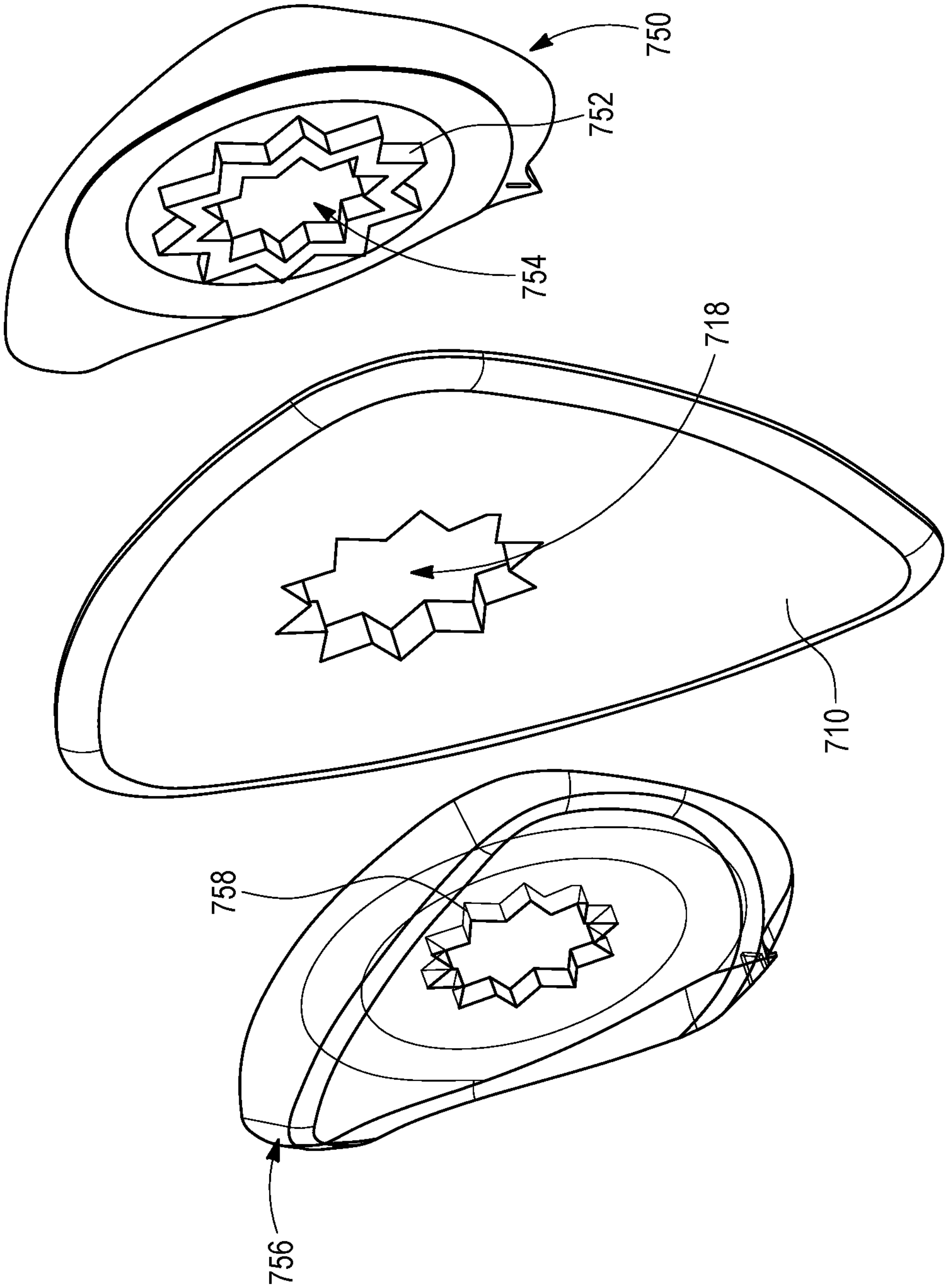
FIG. 7C is an exploded view of a cradle angle tool having rotational nodes with nesting axles, according to an illustrative embodiment.

FIG. 7C is an exploded view of a cradle angle tool having rotational nodes with nesting axles, according to an illustrative embodiment. A first rotational node 750 can have a keyed axle 752 that is sized and shaped to engage with the keyed hole 718 on the base 710. A second rotational node 756 can have a smaller keyed axle 758 (shown in phantom, on the back side of second rotational node 756) that is sized and shaped to fit within a keyed cavity 754 inside the keyed axle 752 of the first rotational node 750. The two axles 752, 758 can nest one inside of the other. Both of the axles 752, 758 can extend through the thickness of the plectrum base 710. This allows for the axles to have sufficient strength and to have sufficient connection to the plectrum base even in the case of very thin plectra.

In various embodiments, a tool for determining the optimal angles of the finger cradle and the thumb cradle can have holes that can be round, and the axles can be round and designed to rotate within the holes. In the embodiment, the rotating nodes and axles can be unitary, or put another way, each of the rotating nodes can be a single piece that can rotate relative to the plectrum base in a round hole.

Figure 7D:
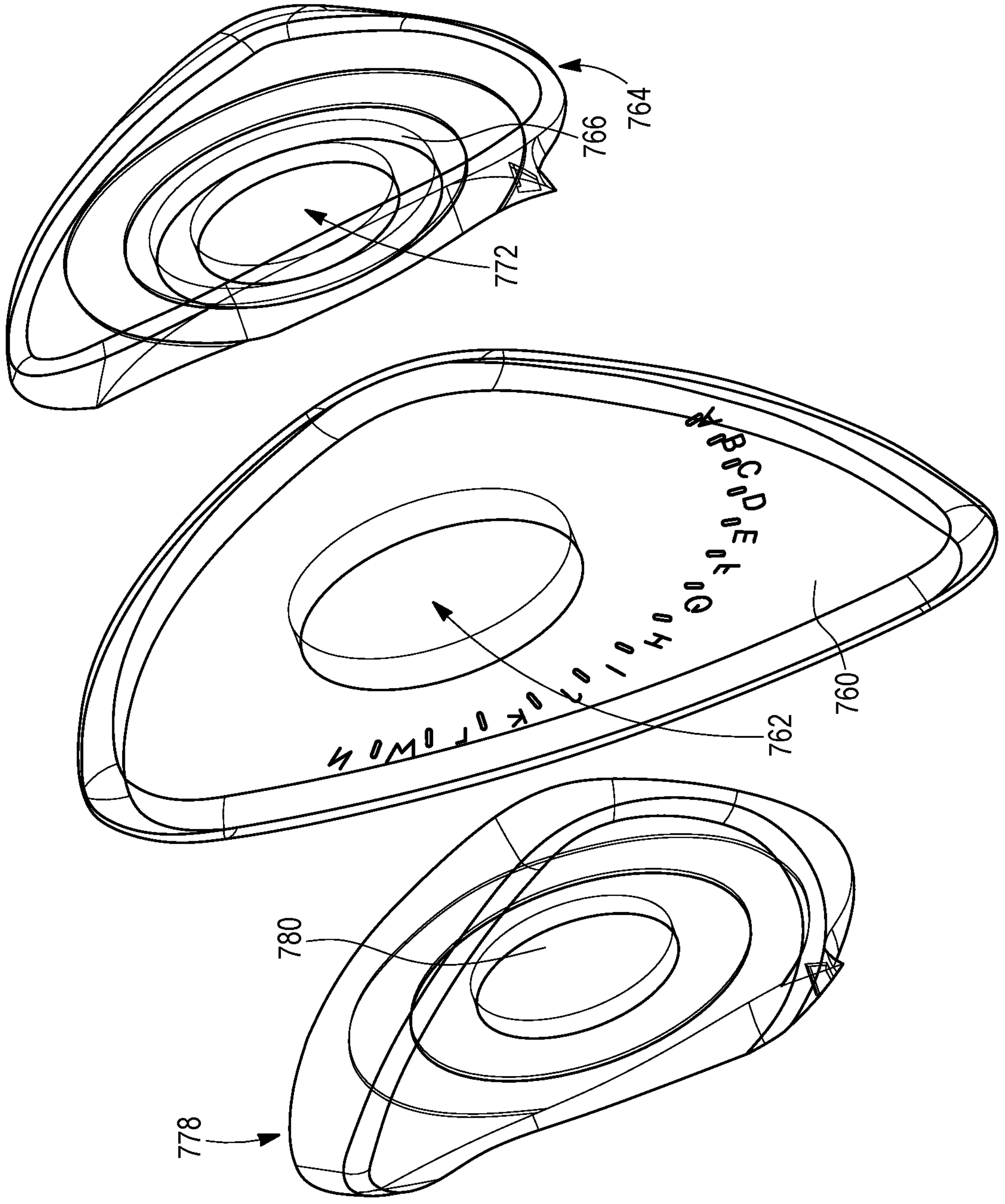
FIG. 7D is an exploded view of a cradle angle tool with a round hole and rotational nodes having nesting round axles, for determining the optimal angles of the finger cradle and the thumb cradle, according to an illustrative embodiment.

FIG. 7D is an exploded view of a cradle angle tool with a round hole and rotational nodes having nesting round axles, for determining the optimal angles of the non-thumb finger cradle and the thumb cradle, according to an illustrative embodiment. In various embodiments, a plectrum base 760 can have a round hole 762, and a first rotational node 764 can have a round axle 766 that is sized and shaped to engage with the round hole 762 on the base 760. A second rotational node 768 can have a smaller round axle 770 (shown in phantom, on the back of the second rotational node) that is sized and shaped to fit within a round cavity 772 inside the round axle 766 of the first rotational node 764. The two axles 766, 770 can nest one inside of the other and share the same rotational axis. Both of the axles 766, 770 can extend through the thickness of the plectrum base 760. This allows for the axles to have sufficient strength and to have sufficient connection to the plectrum base even in the case of very thin plectra.

In various embodiments, a customizable plectrum designed to be used by the end user for striking strings can have rotating nodes 740, and the user can secure the nodes into a desired rotational position using adhesive, screws, or other means for securing the rotational nodes relative to the plectrum. A plectrum with rotational nodes can allow the end user to position the nodes and plectrum in a desired position and orientation relative to each other and then secure those nodes into place for future use. Any of the various embodiments with rotating nodes described above, including the embodiments shown in FIGS. 7A-7D, can be used to create a customized plectrum to be used by the end user for striking strings by securing the rotating nodes in a fixed position and orientation. In various embodiments, the nodes can rotate through an infinite number of positions relative to the plectrum base, thereby allowing for maximum customization.

Any of the various embodiments with rotating nodes described above, including the embodiments shown in FIGS. 7A-7D, can be used to measure preferred angles, and those angle measurements can be used to provide a plectrum having nodes with cradles at the desired angles, and/or those angle measurements can be used to create a new customized plectrum to be used by the end user for striking strings.

Figure 7E:
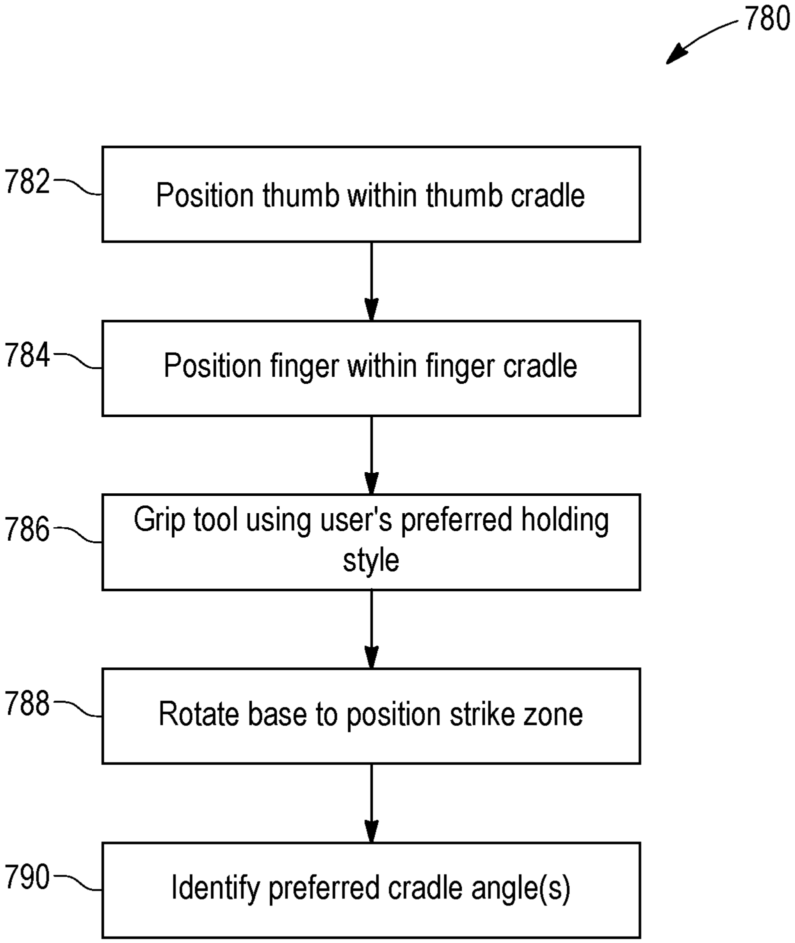
FIG. 7E is a chart showing a method for identifying preferred cradle angles, according to an illustrative embodiment.

FIG. 7E is a chart showing a method 780 for identifying preferred cradle angles, according to an illustrative embodiment. At box 782, the user can position the thumb within the rotational thumb cradle on the thumb side of the cradle angle tool. At box 784, the user can position the non-thumb finger within the rotational finger cradle on the finger side of the cradle angle tool. At box 786, the user can grip the cradle angle tool in the user's preferred holding style. At box 788, the user can rotate the base so that the strike zone is in an optimal position and orientation relative to the fingers. At box 790, the user can identify the preferred cradle angle(s) by seeing where the pointer(s) point to the preferred cradle angle indicator(s), which, in various embodiments, can include the use of graduated scales on one or both sides of the base.

After a user has identified the preferred characteristics for a customized plectrum, the user can select a plectrum with those characteristics. In various embodiments, a user may have identified preferred characteristics across several parameters. As the number of parameters increases, the number of possible ideal plectra grows exponentially. In an embodiment, a retailer can have a kit to organize and distribute various plectra. In an embodiment, the kit can consist of a number of drawers, wherein each drawer can have a grid of compartments, with one parameter scaling from side to side, and another parameter scaling from front to back. A series of drawers can be stacked together, with a third parameter scaling from top to bottom across the drawers, and multiple stacks can allow another parameter to scale across stacks. As the number of parameters increases, the inventory and storage requirements can also increase.

Figure 8A:
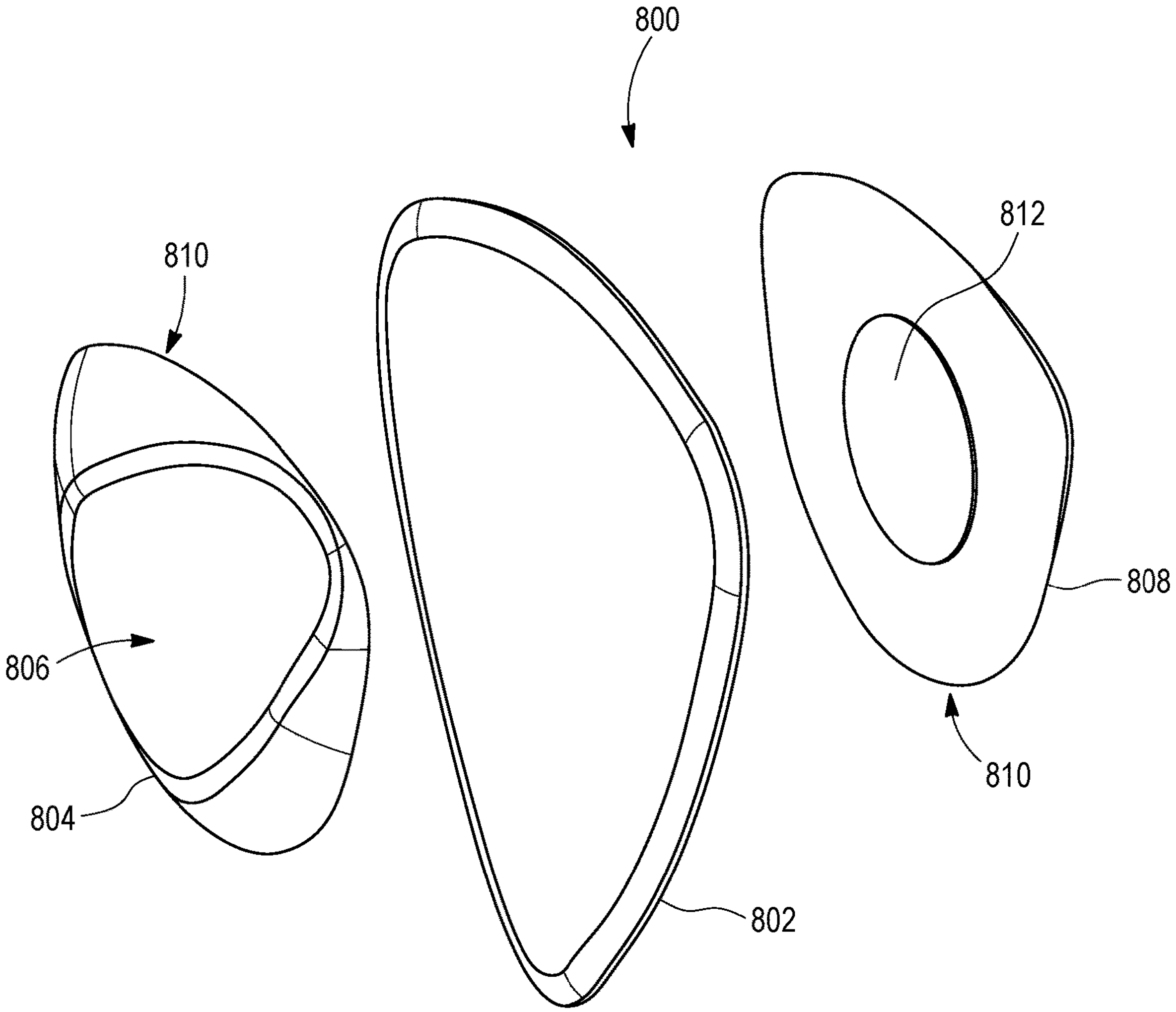
FIG. 8A is an exploded view of a modular customizable plectrum, according to an illustrative embodiment.

In various embodiments, the amount of inventory can be reduced by assembling customized plectra that conform to desired characteristics. FIG. 8A is an exploded view of a modular customizable plectrum, according to an illustrative embodiment. A user can build a customized modular plectrum by selecting a base and one or more module nodes to be assembled into a single plectrum. A modular customized plectrum 800 can have an underlying plectrum base 802, and one or more module nodes 810 can be attached to the base 802. Base 802 can be a flat plectrum, and in various embodiments, base 802 can be a traditional flat plectrum sold by any number of existing manufacturers. A user can select a plectrum base 802 with desired characteristics such as desired hardness, material, thickness, etc. A user can also select one or two module nodes with desired characteristics. For example, a user can select a finger module node 804 that has a finger cradle 806 with the desired size and shape and/or has a finger cradle 806 with the desired cradle angle. Similarly, the user can select a thumb module node 808 that has a thumb cradle with the desired size and shape and/or has a thumb cradle with the desired cradle angle. The one or more module nodes can then be bonded to the base 802 using adhesive 812. The adhesive 812 can be a cyanoacrylate glue, an epoxy, double-sided tape, or various other means for creating a lasting and durable bond. The use of module nodes to create a modular customized plectrum allows for a significant reduction in the inventory required for a retailer to provide customized plectra. A retailer can stock thumb nodes in a range of angles and a range of sizes, and also non-thumb finger nodes in a range of angles and range of sizes, without the need to stock an exponentially larger number of possible combinations. A retailer may also be able to stock nodes with different hardness or resilience or surface textures, so that a customer can build a customized plectrum that includes a preferred node hardness characteristic.

A retailer can have a kit with a number of different module components across a number of different parameters to allow for a customized mix-and-match modular plectrum construction. By way of non-limiting example, a retailer could stock several pick sizes, several pick stiffnesses, several index node shapes, several thumb node shapes, several index node durometers, several thumb node durometers, several surface textures, etc. If a retailer stocks just three different characteristics across each parameter, such as three pick sizes, three pick stiffnesses, etc., across just seven parameters, thousands of different combinations are possible for customized plectra.

In an embodiment, a retailer can have a testing kit so that a customer can experiment with a variety of different assembled modular customized plectra. In the testing kit embodiment, the adhesive 812 can be a strong magnet, and the plectrum base 802 can be made of a ferromagnetic metal, or have a ferromagnetic metal embedded in the base 802. A retailer may have one magnetic module node for each possible cradle size/cradle angle combination, so that a customer can test drive different possible combinations of non-thumb finger nodes and thumb nodes on a playable plectrum.

In various embodiments, nodes with adhesive 812 being strong magnets can allow the use of an off-the-shelf non-magnetic plectrum base. A non-thumb finger module node can have a strong magnet and a thumb module node can have a strong magnet, with the magnets arranged so that the non-thumb finger module node and the thumb module node can attract each other. The two magnetic nodes can sandwich a non-magnetic off-the-shelf plectrum base, so that the two nodes are held in place on the plectrum base by mutual magnetic attraction. This can allow for a retailer to provide a convenient way for a user to test drive various combinations of non-thumb finger module nodes, thumb module nodes, and plectrum bases.

In addition to facilitating test drives, embodiments with nodes having a strong magnet as adhesive 812 can also create a playable, customizable plectrum. This can allow the nodes to be easily removed from the underlying plectrum. A user can remove the removable nodes from a worn or damaged plectrum, and the user can replace the worn or damaged plectrum and then add the magnetic nodes to the sides of the new plectrum. This allows the user to keep and reuse the same nodes while also being able to easily switch to a new off-the-shelf plectrum base. This can also allow a user to briefly adjust the arrangement or configuration of the base and cradles, including the option to change one or more cradles, change the plectrum base, or change the location or position of one or more cradles relative to the base. The user can make short-term adjustments, and can then revert back to an original configuration, or make further adjustments, as may be desired for different songs or different sounds.

Embodiments with nodes having a strong magnet as adhesive 812 can also allow a user to transfer customized cradles from one plectrum to another indefinitely. A user may have nodes that are particularly expensive, sentimental, or otherwise valuable that the user may want to transfer and keep for a lifetime. A user may have nodes that are custom-machined, made out of advanced materials such as titanium or carbon fiber, made from expensive materials such as gold and diamonds, autographed or once used by someone famous, etc. Embodiments with nodes having a strong magnet as adhesive 812 can allow the user to keep a particular set of nodes forever and move them from one plectrum to another.

Figure 8B:
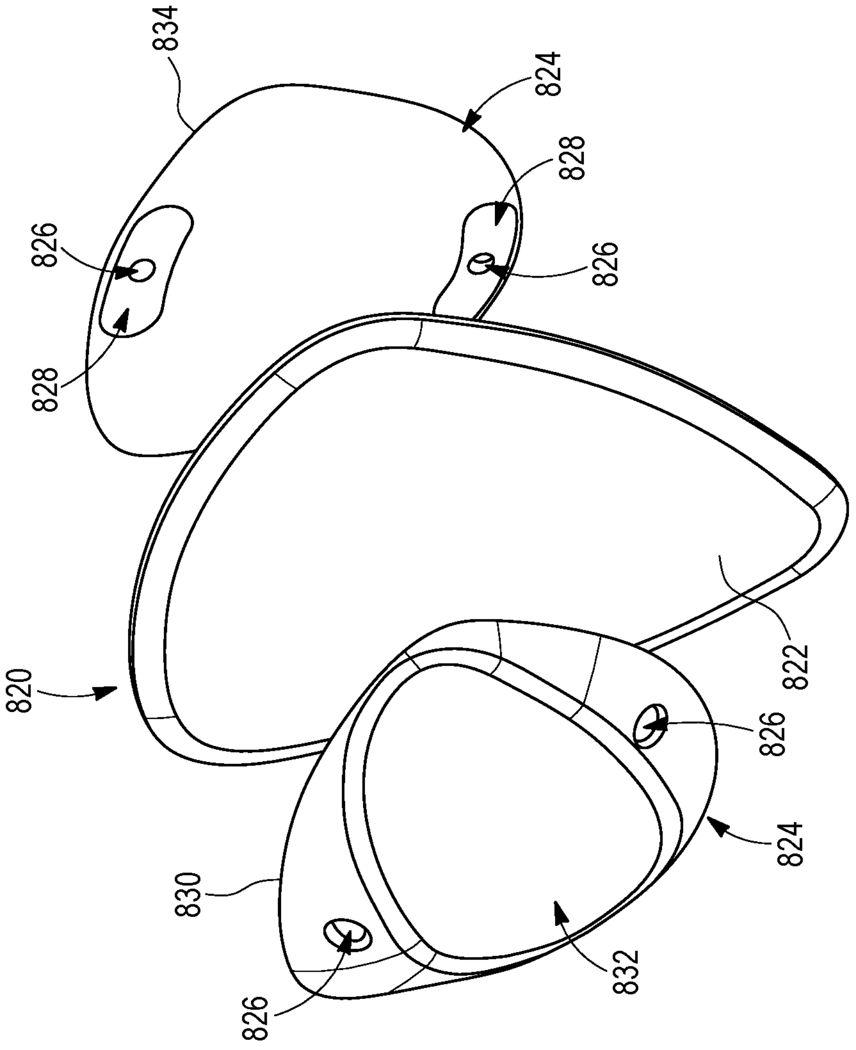
FIG. 8B is an exploded view of a modular customizable plectrum with adhesive ports, according to an illustrative embodiment.

FIG. 8B is an exploded view of a modular customizable plectrum with adhesive ports, according to an illustrative embodiment. A user can build a customized modular plectrum by selecting a base and one or more module nodes to be assembled into a single plectrum. A modular customized plectrum 820 can have an underlying plectrum base 822, and one or more module nodes 824 can be attached to the base 822. Base 822 can be a flat plectrum, and in various embodiments, base 822 can be a traditional flat plectrum sold by any number of existing manufacturers. A user can select a plectrum base 822 with desired characteristics such as desired hardness, material, thickness, etc. A user can also select one or two module nodes 824 with desired characteristics. For example, a user can select a finger module node 830 that has a finger cradle 832 with the desired size and shape and/or has a finger cradle 832 with the desired cradle angle. Similarly, the user can select a thumb module node 834 that has a thumb cradle with the desired size and shape and/or has a thumb cradle with the desired cradle angle. The one or more module nodes 824 can have adhesive ports 826. The adhesive ports 826 can connect to an adhesive cavity 828 in the underside of the node 824. The adhesive ports 826 allow a user to inject adhesive through the port 826 to bond the node onto the base after the selected node has been placed in the desired position and orientation. The adhesive cavity 828 allows for the injected adhesive to flow to, and bond over, an increased contact area between the node 824 and the surface of the plectrum base 822. By injecting adhesive through the adhesive port(s), the one or more module nodes 824 can then be bonded to the base 822 using liquid adhesive.

Figure 8D:
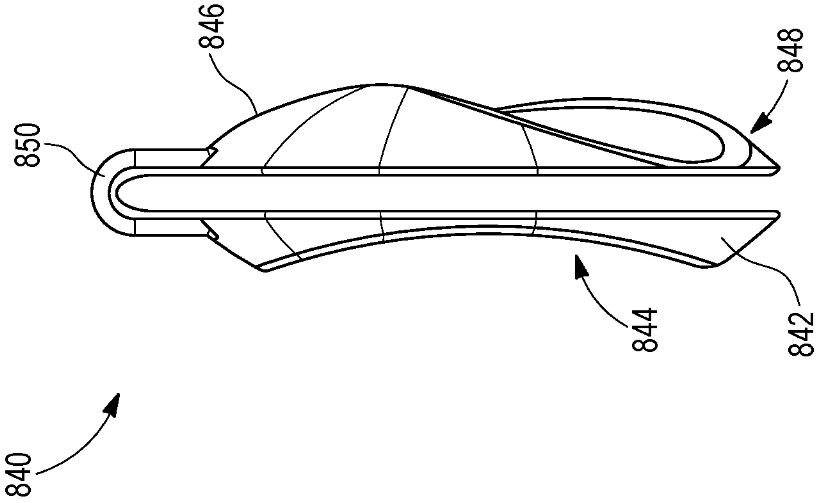
FIG. 8D is a side view of a double node clamp, according to an embodiment.
Figure 8C:
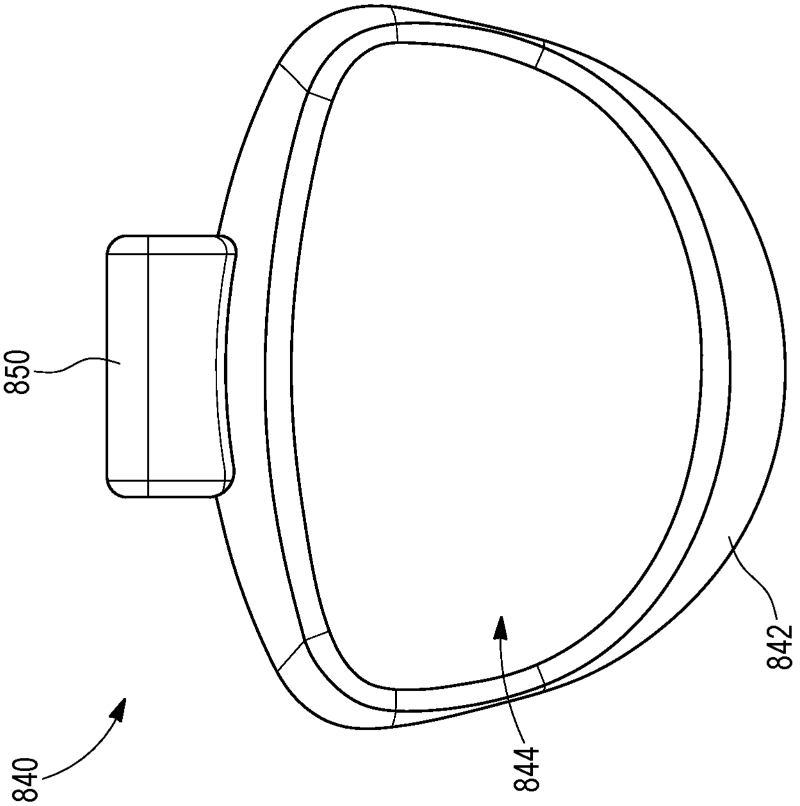
FIG. 8C is a front view of a double node clamp, according to an illustrative embodiment.

In various embodiments, a modular customizable plectrum can have two nodes connected together in an arrangement adapted for quick and convenient mounting on a plectrum base. FIG. 8C is a front view of a double node clamp, according to an illustrative embodiment, and FIG. 8D is a side view of a double node clamp, according to an embodiment. A double node clamp 840 can include a thumb module node 842 with a thumb cradle 844 and a finger module node 846 with a finger cradle 848. As described above, the nodes can have various parameters such as cradle shapes, cradle sizes, attack angles, etc. that have been adapted so that each individual user can have a plectra that is well-suited to that user. Various methods described above can be used to identify preferred characteristics for an individual user. The thumb module node 842 and the finger module node 846 can be connected to each other with a web hinge 850. Web hinge 850 can be rigid or semi-rigid, allowing the thumb module node and the finger module node to be slightly separated apart from each other by a user so that the double node clamp can be clamped onto a standard plectrum base.

As described herein, a double node clamp can have two nodes that both have characteristics selected to suit the preferences of an individual user along a hinge and clamp structure that holds the double node clamp onto the plectrum. However, in various embodiments, a single node clamp may have only one customized node, and the opposite side may be flat or otherwise uncustomized. In embodiments of a single node clamp, the non-customized side can operate as one side of the clamp, and may lay flat against the plectrum while helping to pinch onto the plectrum and hold the single node clamp in place.

Figure 8F:
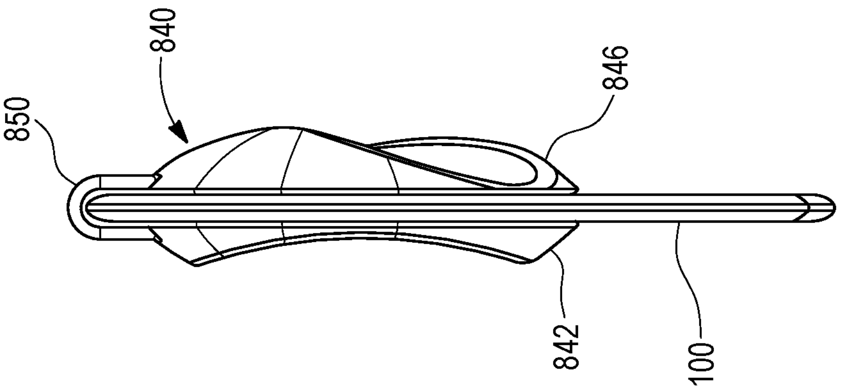
FIG. 8F is a side view of a double node clamp installed on a traditional flat plectrum base, according to an illustrative embodiment.
Figure 8E:
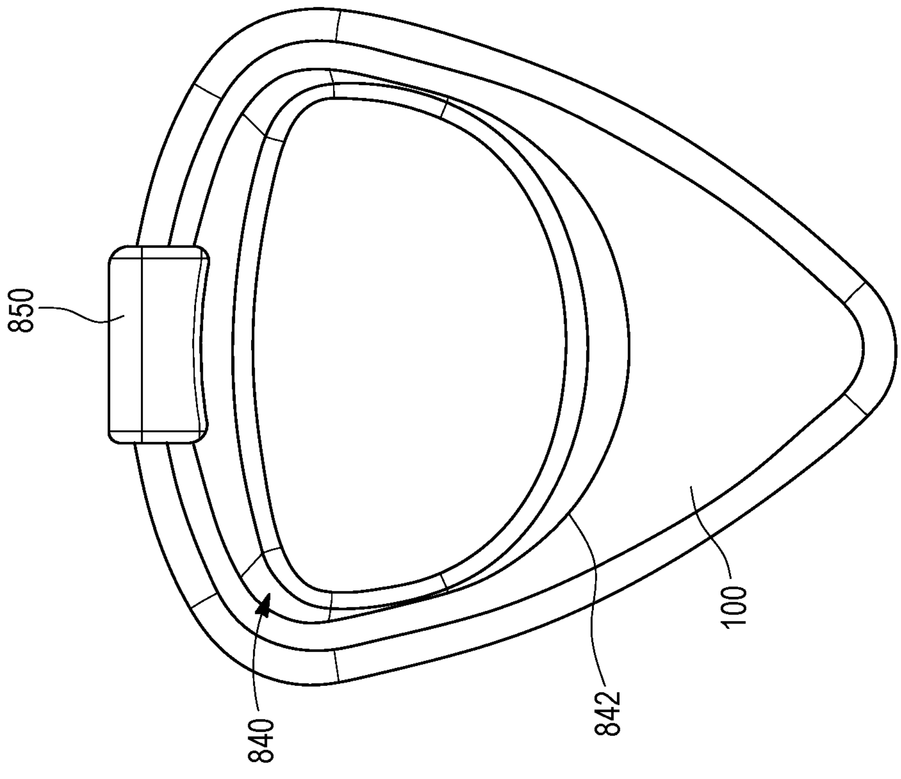
FIG. 8E is a front view of a double node clamp installed on a traditional flat plectrum base, according to an illustrative embodiment.

FIG. 8E is a front view of a double node clamp installed on a traditional flat plectrum base, according to an illustrative embodiment, and FIG. 8F is a side view of a double node clamp installed on a traditional flat plectrum base, according to an illustrative embodiment. The double node clamp 840 is well adapted for use on a traditional flat plectrum base 100 so that the traditional flat plectrum base can become a customized plectrum, however, the double node clamp 840 can also be applied to various modified plectrum as well. The hinge 850 can be spread to allow the thumb module node 842 and the finger module node 846 to separate slightly so that the double node clamp 840 can be slid over the end of the plectrum base.

Different hinges 850 are possible in different embodiments. In various embodiments, a hinge may have a structure that is more rigid to provide a more firm clamping action. However, a more rigid hinge may have a shorter lifespan as it is flexed onto and off of multiple plectra. In various embodiments, a hinge may be less rigid, or semi rigid, or may have a conventional hinge mechanism. Various embodiments, including but not limited to embodiments having less rigid hinges, can use keys, fasteners, latches, etc. to hold the node clamp in place. In various embodiments, a node clamp can be held in place with various adhesives including glue, magnets, Very High Bond (VHB) tape and/or other adhesives. In various embodiments, one or both nodes of the double node clamp can have adhesive ports, as explained above.

The hinge 850 can also lock the thumb node and finger node into a fixed position and orientation relative to each other. A double node clamp can maintain the relative positions and the angles between the selected thumb cradle and finger cradle corresponding to the preferred angles identified by the user. In various embodiments, one or more nodes of a node clamp can have a key, and the plectrum base can have a keyhole, explained more fully below. The key and keyhole can help to hold the node clamp and the plectrum together in a fixed position and orientation relative to each other. The key and keyhole may also eliminate the need for any adhesive, thereby allowing the node clamp to be removed from one plectrum base and clamped onto on a new plectrum base with the key and keyhole engaging to maintain the same position and orientation for each pairing of the node clamp with successive plectra.

Figure 8H:
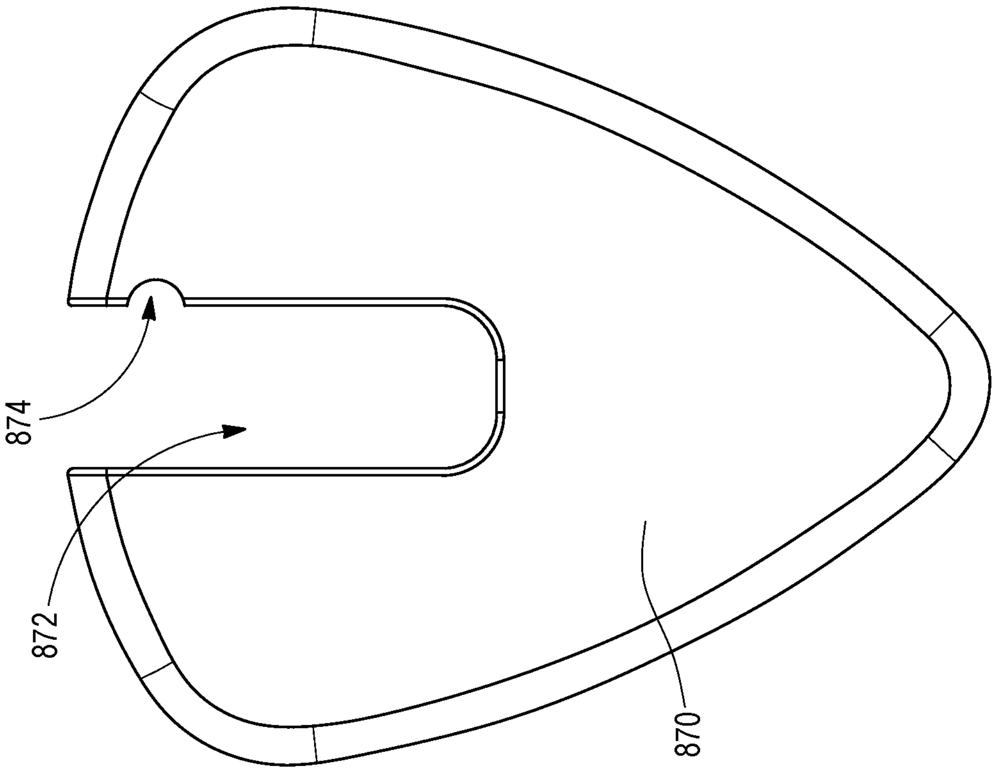
FIG. 8H is a front view of a plectrum base adapted for use with a node clamp having an internal pillar.
Figure 8G:
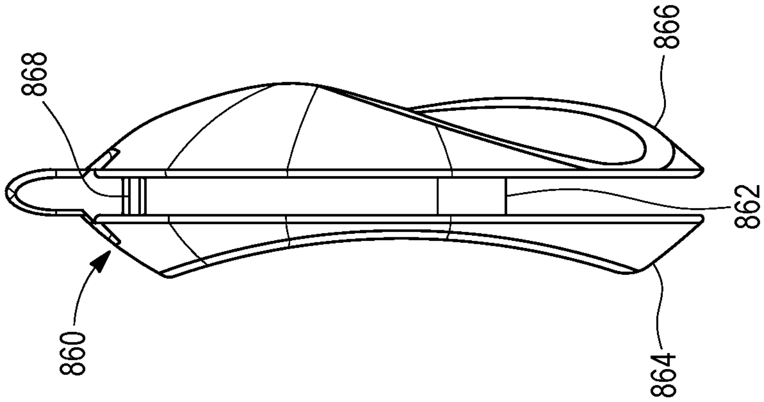
FIG. 8G is a side view of a node clamp with an internal pillar, according to an illustrative embodiment.

FIG. 8G is a side view of a node clamp with an internal pillar, according to an illustrative embodiment, and FIG. 8H is a front view of a plectrum base adapted for use with a node clamp having an internal pillar. In various embodiments, a node clamp 860 can be a monolithic rigid unit with a central pillar 862 holding the thumb node 864 and the finger node 866 in a locked position so that they cannot be separated relative to each other. A plectrum base 870 can have a notch 872 that is sized and shaped to accommodate the pillar 862.

In various embodiments, the nodes can be held to the plectrum using various means described above and/or below, including adhesives, fasteners, pins or keys, magnets, etc. In various embodiments, friction between the plectrum and the pillar and/or friction between the plectrum and the nodes may hold the clamp and the plectrum together. Friction can be increased by providing a rubberized surface between the node(s) and the plectrum, providing a notch that only just big enough to allow the pillar to be press-fit into place within the notch, providing various engaging surfaces on the underside of the node(s) and face(s) of the plectrum, and/or various other friction enhancers.

In various embodiments, the walls of the notch 872 may have various concavities such as concavity 874. A pillar can have a tooth 868 designed to snap into concavity 874 and hold the pillar in place within the notch 872. In various embodiments, the pillar itself can be cylindrical or partially cylindrical and the walls of the notch can have concavities adapted be engaged by the pillar and secure the pillar in place. Various concavity shapes and corresponding pillar shapes are possible, and different shapes may lock the node clamp into place more securely or allow the node clamp to be removed more easily. As described more fully below, and especially in regard to FIGS. 9B-10E, various shapes and orientations of keyholes and corresponding keys can also be used to secure a node clamp to a plectrum.

Figure 8J:
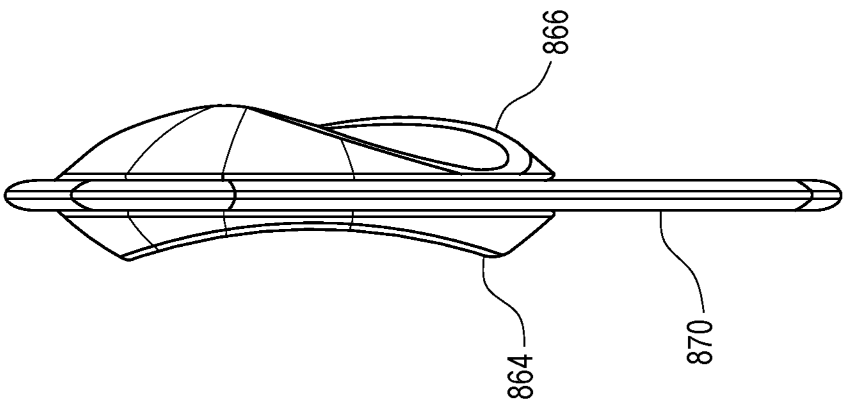
FIG. 8J is a side view of a node clamp having a pillar that is engaged with a plectrum having a notch, according to an illustrative embodiment.
Figure 8I:
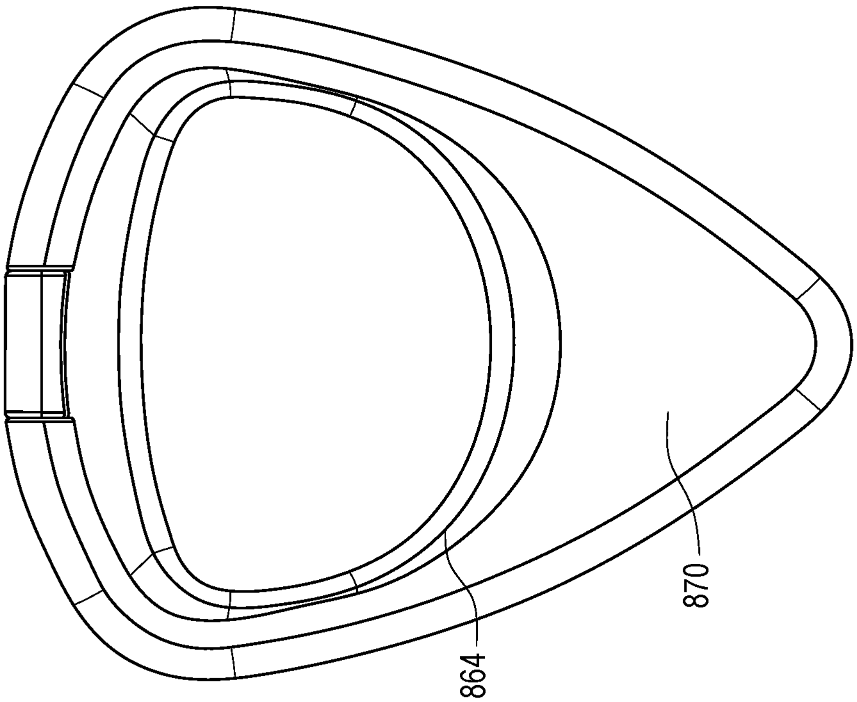
FIG. 8I is a front view of a node clamp having a pillar that is engaged with a plectrum having a notch, according to an illustrative embodiment.

FIG. 8I is a front view of a node clamp having a pillar that is engaged with a plectrum having a notch, according to an illustrative embodiment, and FIG. 8J is a side view of a node clamp having a pillar that is engaged with a plectrum having a notch, according to an illustrative embodiment. The pillar length can correspond with the thickness of the plectrum so that the nodes 864, 866 are held tightly against the plectrum base 870. As described more fully below, and especially in regard to FIGS. 10A-10E, a user may select a standard, off the shelf plectrum and that plectrum can be modified to accommodate a node clamp with a pillar. In various embodiments a notch can be cut or punched out of a traditional flat plectrum so that any plectrum can be customized with nodes selected by a user.

As explained above, the use of module nodes to create a modular customized plectrum allows for a significant reduction in the inventory required for a retailer to provide customized plectra. A retailer can stock thumb nodes in a range of angles and a range of sizes, and also non-thumb finger nodes in a range of angles and range of sizes, without the need to stock an exponentially larger number of possible combinations. A retailer may also be able to stock nodes with different hardness or resilience or surface textures, so that a customer can build a customized plectrum that includes a preferred node hardness characteristic.

Figure 9A:
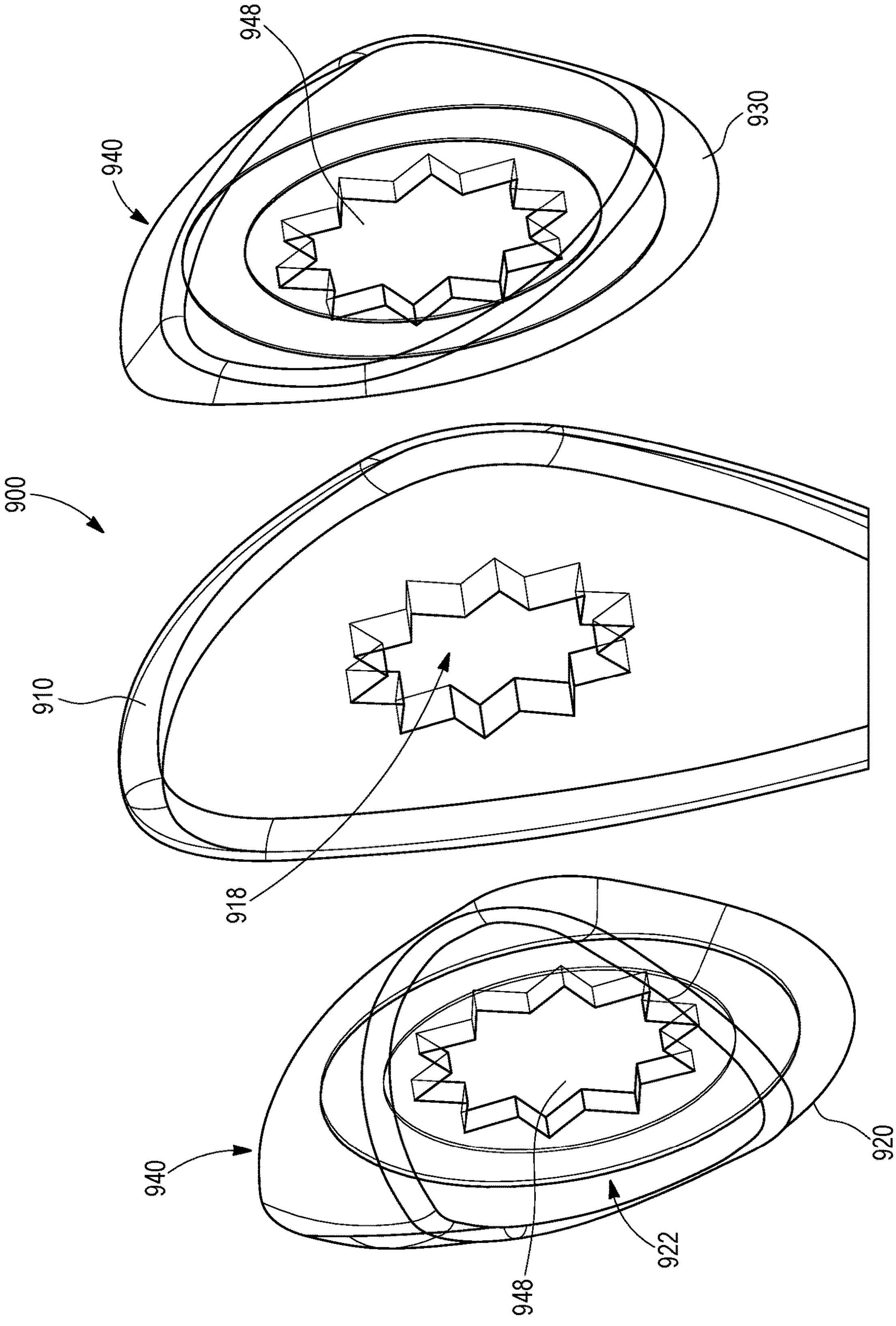
FIG. 9A is an exploded view of a modular customizable plectrum, shown in phantom and with a keyed hole, according to an illustrative embodiment.

FIG. 9A is an exploded view of a modular customizable plectrum shown in phantom and with a keyed hole, according to an illustrative embodiment. A user can build a customized modular plectrum 900 by selecting a base and one or more module nodes to be assembled into a single plectrum. A keyhole plectrum base 910 can have a keyhole 918, and one or two module nodes 940 can have keys 948 that engage into keyhole 918. For example, a non-thumb finger module node 920 with a finger cradle 922 can have a key 948 that can engage into a keyhole 918, and a thumb module node 930 can have a key 948 that engages into a keyhole 918. A key can extend from the back, or non-cradle side, of the node. The keys 948 and keyhole 918 are sized and shaped so that the keys nest securely within the keyhole 918, and the shape of the keyhole and keys prevents the keys from rotating within the keyhole. In various embodiments, the keyhole and keys can be star shaped, square, triangular, tear-drop shaped, or various other shapes that prevent rotational movement of the axle relative to the base. In various embodiments, each key can occupy half, or less than half, of the area of the keyhole, so that the two keys can exist next to each other and each key can extend through the entire base while remaining in a fixed position and orientation relative to the base and each other. In various embodiments, a key can occupy half or less than half of the depth of a keyhole, so that the two keys can exist together in the base while remaining in a fixed position and orientation relative to the base and each other.

In various embodiments, a plectrum base 910 can have two or more distinct keyholes. In an embodiment, each module node can have a single key that engages into a different keyhole, with a separate keyhole for each module's key. The base can have two distinct holes that can be different sizes and/or shapes, and each of the two module nodes can have keys that correspond to one, but not the other, of the two keyholes. In this way, the position and orientation of the two nodes can be non-interchangeably fixed relative to the plectrum base. In various embodiments, the keys can be on the plectra, and the nodes can have the corresponding keyholes to accommodate the keys.

Figure 9B:
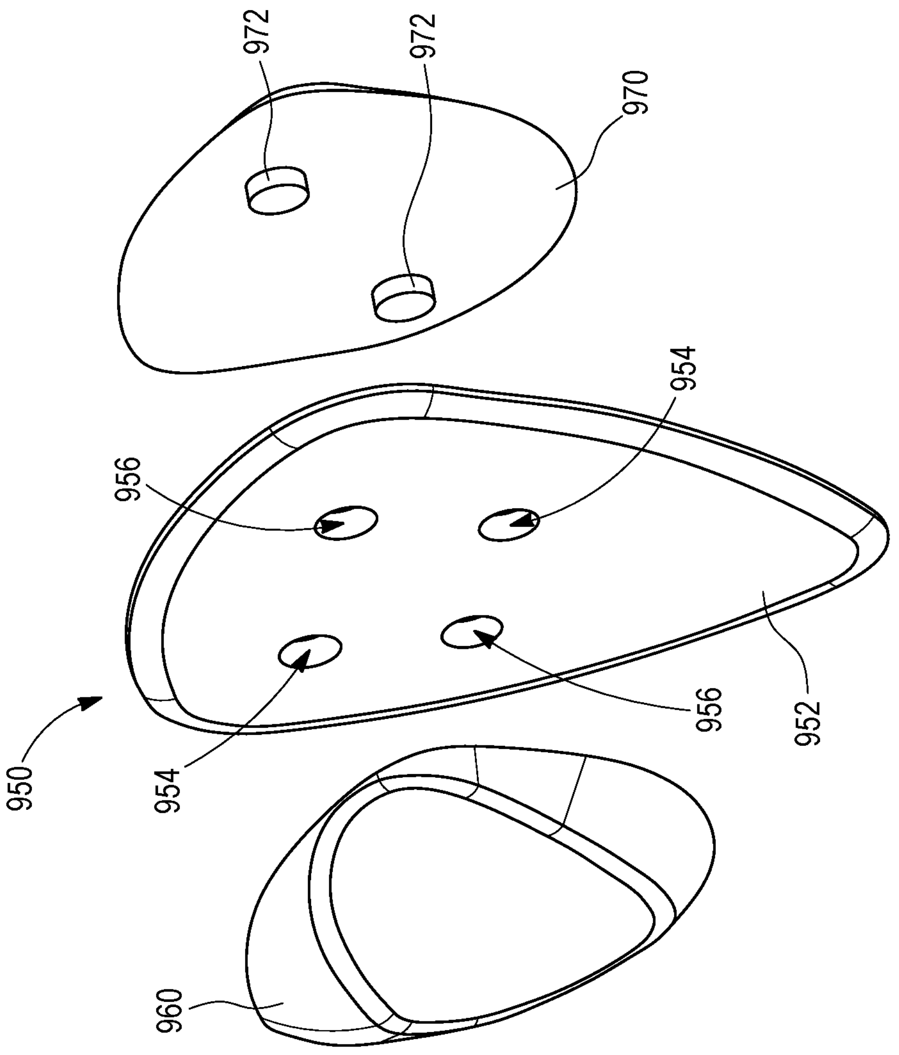
FIG. 9B is an exploded perspective view of a modular customizable plectrum with multiple mounting holes in the base for each node, according to an illustrative embodiment.

In an embodiment, each module can have more than one key, and the plectrum base can have corresponding keyholes. The arrangement of multiple keys for each node can prevent the node from rotating relative to the base. FIG. 9B is an exploded perspective view of a modular customizable plectrum with multiple mounting holes in the base for each node, according to an illustrative embodiment. A user can build a customized modular plectrum 950 by selecting a base 952 and one or more module nodes to be assembled into a single plectrum. A keyhole plectrum base 952 can have a plurality of keyholes for each node, and the size, shape, and/or arrangement of the keyholes can be unique to each node, or can be interchangeable. In various embodiments, the distance between keyholes and/or the arrangement of particular sizes and/or shapes of keyholes can be unique to each node. The plectrum base 952 can have a plurality of non-thumb finger node keyholes 954 that are adapted to accommodate corresponding keys on the back of the non-thumb finger node 960. The plectrum base 950 can have a plurality of thumb node keyholes 956 that are adapted to accommodate corresponding keys 972 on the back of the thumb node 970. The arrangement of multiple keys on the back of the same node assures that the node is prevented from rotating or shifting, and is held in a fixed position and orientation relative to the plectrum base. In various embodiments, the non-thumb finger node keyholes 954 and thumb node keyholes 956 can be distinct, or they can be identical holes. In various embodiments, the non-thumb finger node keyholes 954 and thumb node keyholes 956 can be identical holes that are punched in the base 952 by the same hole punch device.

A user can select a plectrum base with desired characteristics such as desired hardness, material, thickness, etc. A user can also select one or two module nodes with desired characteristics. For example, a user can select a non-thumb finger module node that has a finger cradle with the desired size and shape and/or has a finger cradle with the desired cradle angle. Similarly, the user can select a thumb module node that has a thumb cradle with the desired size and shape and/or has a thumb cradle with the desired cradle angle. The unique size and shape of the keyhole(s) and keys can create a limited number of rotational positions for each node, so that the customized modular plectrum can have 'foolproof' assembly. Because the position and orientation of the node relative to the base is determined by the keyhole and key, in an embodiment, the customized modular plectrum can only be assembled in a discrete number of ways. Depending on the shape of the key and keyhole, that number of ways could be only one way, resulting in a final assembled plectrum that can be guaranteed to conform to the desired characteristics.

A customer can 'test drive' various combinations of bases and nodes to ensure that the customer has selected the best combination. After determining that the best combination has been found, an adhesive can be added to the key and/or keyhole to create a lasting and durable plectrum.

In various embodiments, nodes can have magnets as adhesives, as described above in regard to FIG. 8A. Nodes having magnets as adhesives can allow the nodes to be removed from a first plectrum and added to a new plectrum so that a user can change plectrum bases but keep the same nodes. The two nodes can be held in place on the plectrum base by mutual magnetic attraction. This magnetic attraction can work in combination with various keying features, such as the keying features described above in regard to FIGS. 9A and 9B, to removably lock the nodes in place in the desired angle and orientation while still facilitating easy transfer of the nodes to a new base. The keying features can maintain the desired angle and orientation, while the magnet features can removably hold the nodes in place with the desired angle and orientation.

In various embodiments, the keyhole and key can be a multi-spoked shape such as a star that can allow a node to be installed in the plectrum in a variety of rotational positions. In the embodiment, a single node can be placed in a number of orientations so that a single type of node can be used to create a plectrum with various cradle angles. A user can remove the node, rotating the node slightly to the next rotational position, and re-insert the node, so that the plectrum has a different cradle angle. Different cradle angles can be achieved by installing the same node in different rotational positions. This can allow further reduction of inventory, because a retailer can stock nodes in a variety of cradle sizes, and then different cradle angles can be achieved depending on the rotational position in which the node is installed in the plectrum. An adhesive or other means for attachment can secure the node in place in the desired rotational position.

In various embodiments, the keyhole and key can be round, thereby allowing the node to be rotated into an infinite number of orientations. After the node is in a desired orientation, an adhesive can be used to secure the node to the plectrum base in the fixed position and orientation. In various embodiments, the node and base can have a pointer and corresponding tick marks that can indicate the rotational position of the node. This can facilitate duplication of a preferred node rotational position. A user can read the rotational position of a previously prepared customized plectrum, and then the user can prepare a new customized plectrum that matches the preferred rotational angle of the original customized plectrum by aligning the pointer and tick marks in the same way. Each time a preferred customized plectrum is created by aligning the position of the pointer relative to the tick marks, an adhesive can be used to secure the node to the plectrum after the node is in the desired position.

In various embodiments, a user can customize an off-the-shelf traditional flat plectrum by adding one or more nodes. In an embodiment, an off-the-shelf plectrum can have a keyhole punched out of the plectrum, so that keyed nodes can be added to any plectrum. FIG. 10A is a perspective view of a plectrum punch tool, according to an illustrative embodiment. The plectrum punch tool 1000 can have a plectrum support frame 1010. The support frame 1010 can have a series of ridges 1012 that can be sized and shaped to accommodate a variety of sizes and shapes of plectra and hold them securely in a designated position relative to the punch 1020. A punch 1020 can be positioned above the support frame 1010, and a die 1022 can be in a corresponding location in the bottom of, or under, the support frame. The punch and die can be sized and shaped to create a keyhole that corresponds to the size and shape of the keys on module nodes. By way of non-limiting example, this can be starred, square, triangular, round, or other shapes. In various embodiments, a punch and die can be sized and shaped to create a notch or other modification that corresponds to the size and shape of a pillar or other feature of a module node.

Figure 10B:
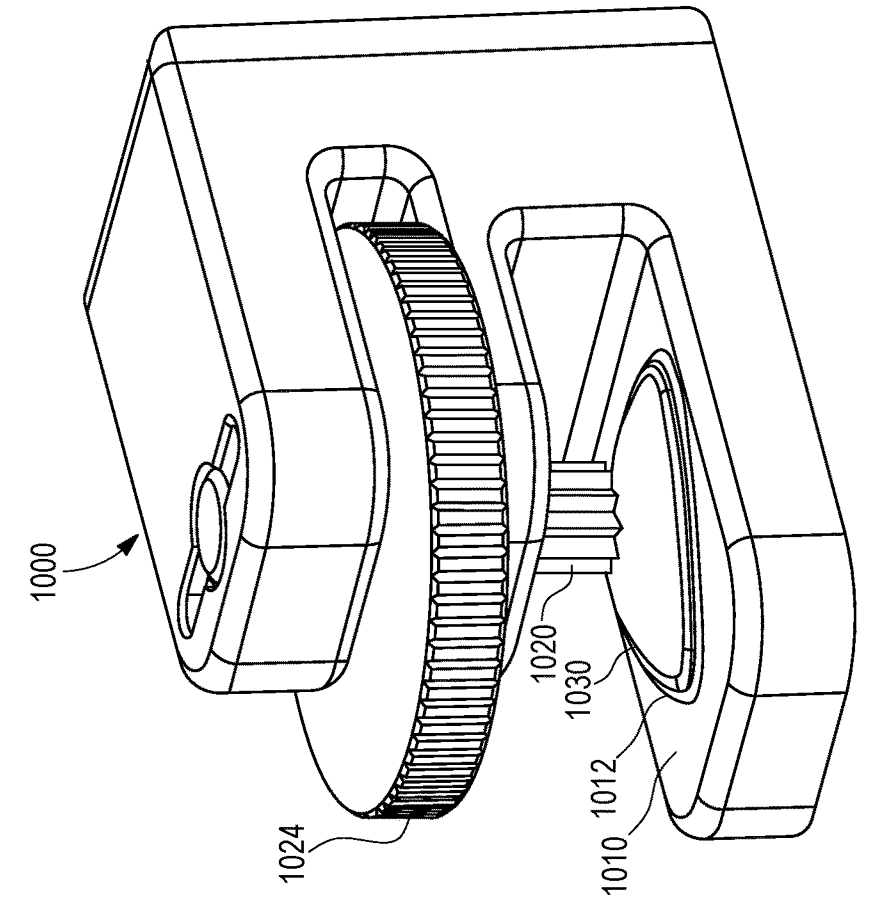
FIG. 10B is a perspective view of a plectrum punch tool with a plectrum in position to be punched, according to an illustrative embodiment.
Figure 10A:
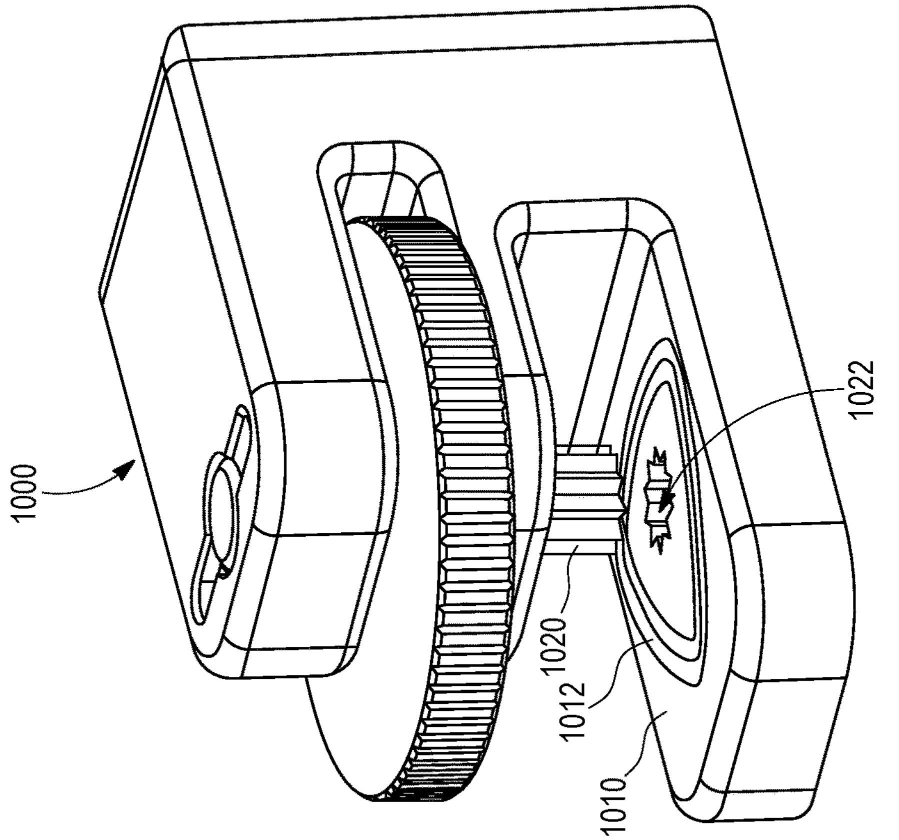
FIG. 10A is a perspective view of a plectrum punch tool, according to an illustrative embodiment.
Figure 10C:
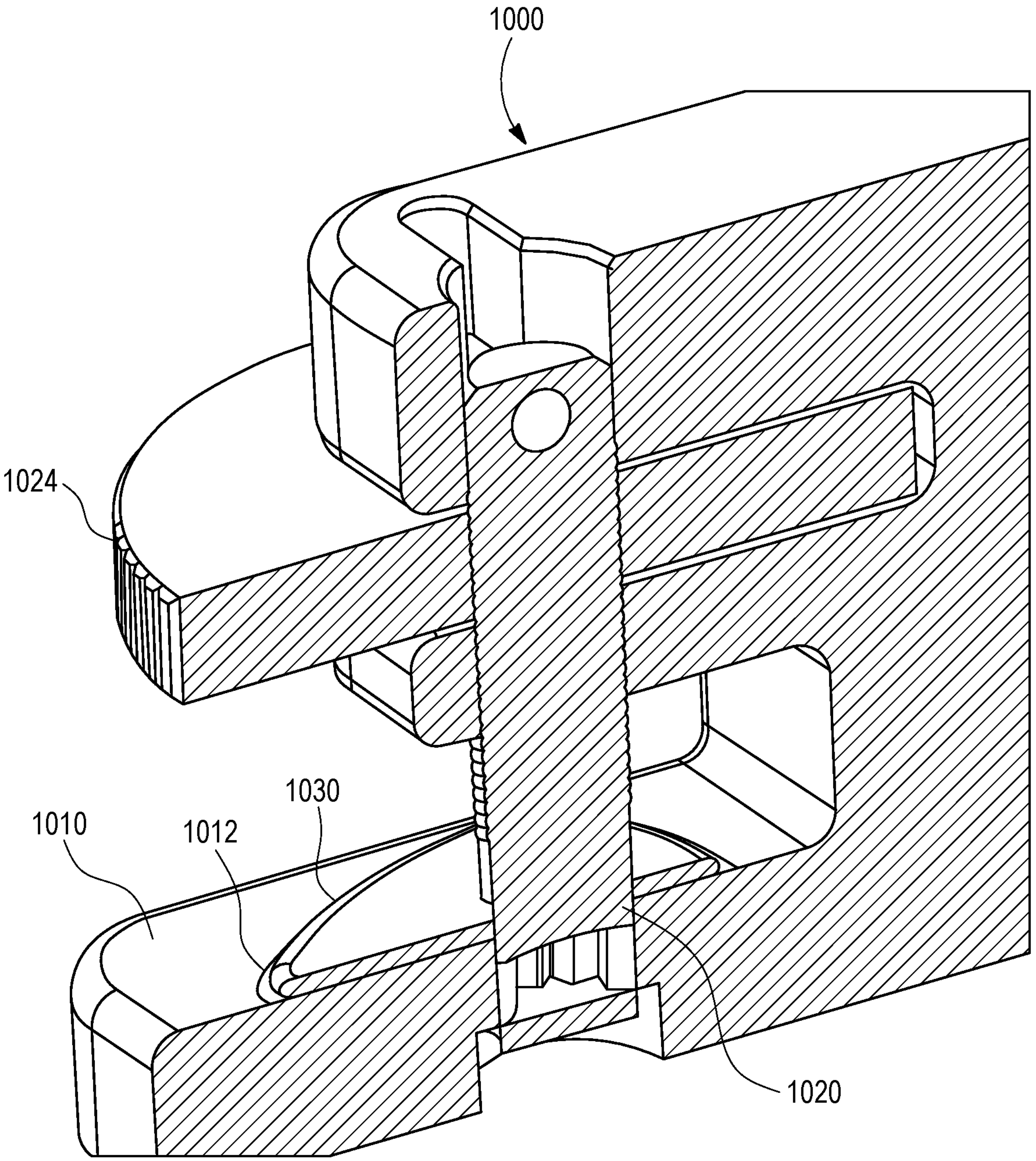
FIG. 10C is a partially cut-away view of a plectrum punch tool, showing the inner workings, according to an illustrative embodiment.

FIG. 10B is a perspective view of a plectrum punch tool with a plectrum in position to be punched, according to an illustrative embodiment, and FIG. 10C is a partially cut-away view of a plectrum punch tool, showing the inner workings, according to an illustrative embodiment. The plectrum 1030 can be held securely in the frame 1010 within ridges 1012, and the punch 1020 can be driven through the plectrum and into the die 1022, thereby punching a keyhole into an off-the-shelf plectrum. In various embodiments, the punch can be forced through the plectrum using any number of mechanical or electromechanical means. As shown in FIG. 10C, a wheel 1024 can allow a user to transfer downward force to the punch 1020 by turning the wheel 1024. Threads on the inner surface of the wheel can engage with threads on the outer surface of the punch stem so that force can be transferred from the wheel to the punch.

Figure 10D:
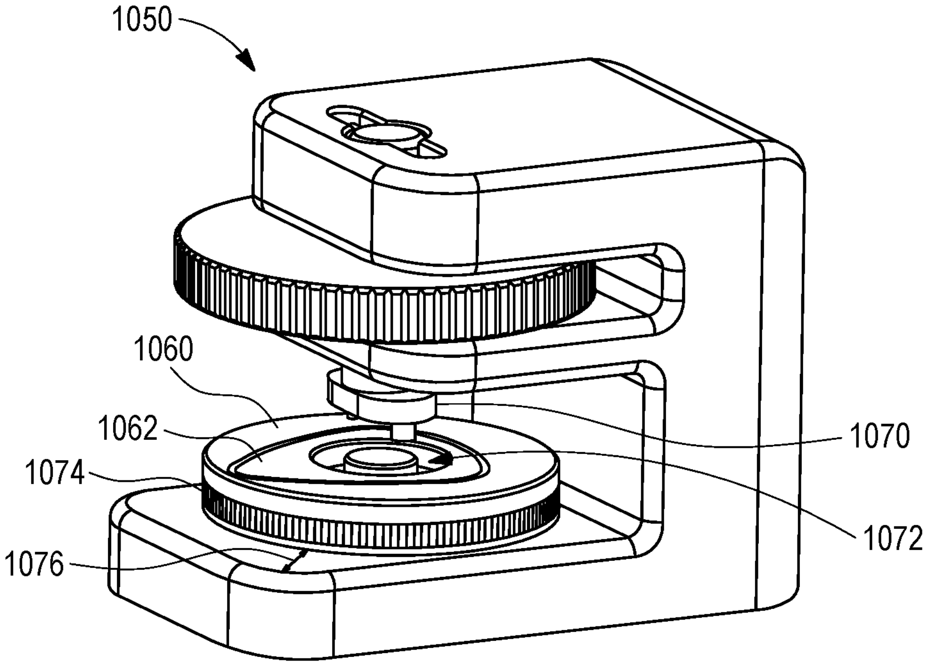
FIG. 10D is a perspective view of a plectrum punch tool for punching multiple keyholes, according to an illustrative embodiment.
Figure 10E:
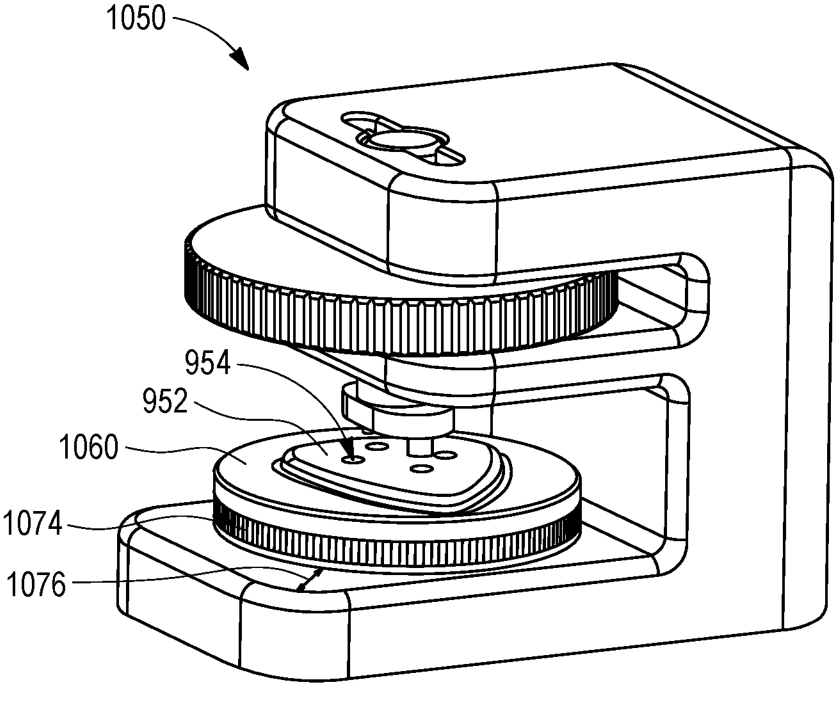
FIG. 10E is a perspective view of the plectrum punch tool having rotated and punched a second set of holes, according to the illustrative embodiment.

In various embodiments, a plectrum punch tool can punch multiple keyholes in a single plectrum. As described above, a node can have multiple keys that correspond to multiple keyholes in the plectrum. FIG. 10D is a perspective view of a plectrum punch tool for punching multiple keyholes, according to an illustrative embodiment. The plectrum punch tool 1050 can have a rotating plectrum support frame 1060. The support frame 1060 can have a series of ridges 1062 that can be sized and shaped to accommodate a variety of sizes and shapes of plectra and hold them securely in a designated position relative to the punch 1070. The punch 1070 can include multiple punches, so that more than one hole can be punched at the same time. In various embodiments, the die 1072 can be integrated into the rotating support frame 1060, and in other embodiments, the rotating support frame can rotate around a fixed die. Turning to FIGS. 9B, 10D, and 10E, the punch and die can be sized and shaped to create a plurality of keyholes 954 in a plectrum base 952 that correspond to the plurality of keys 972 on the back of a node.

The rotating support frame 1060 can rotate under the punch 1070. Graduated markers 1074 and an indicator 1076 can help the user to align a plectrum in the correct orientation relative to the punch. By rotating the plectrum, holes can be punched in the plectrum that correspond to the desired rotational angle of the node. A user can orient the plectrum to a first orientation and punch holes in the plectrum that correspond to the desired rotational angle of a first node, and then the user can orient the plectrum to a second orientation and punch holes in the plectrum that correspond to the desired rotational angle of a second node. By using the rotating plectrum punch tool shown in FIG. 10D, any preferred node can be mounted to any preferred plectrum at any preferred rotational angle.

FIG. 10E is a perspective view of the plectrum punch tool having rotated and punched a second set of holes, according to the illustrative embodiment. FIG. 10E shows the rotating plectrum support frame 1060 rotated into a second position and a second set of holes punched in the plectrum. The first set of holes corresponds to the desired rotational angle of a first node, and the second set of holes corresponds to the desired rotational angle of a second node. A user can use the graduated markers 1074 and indicator 1076 to rotate the rotating plectrum support frame into the desired position for each set of holes.

Figure 11:
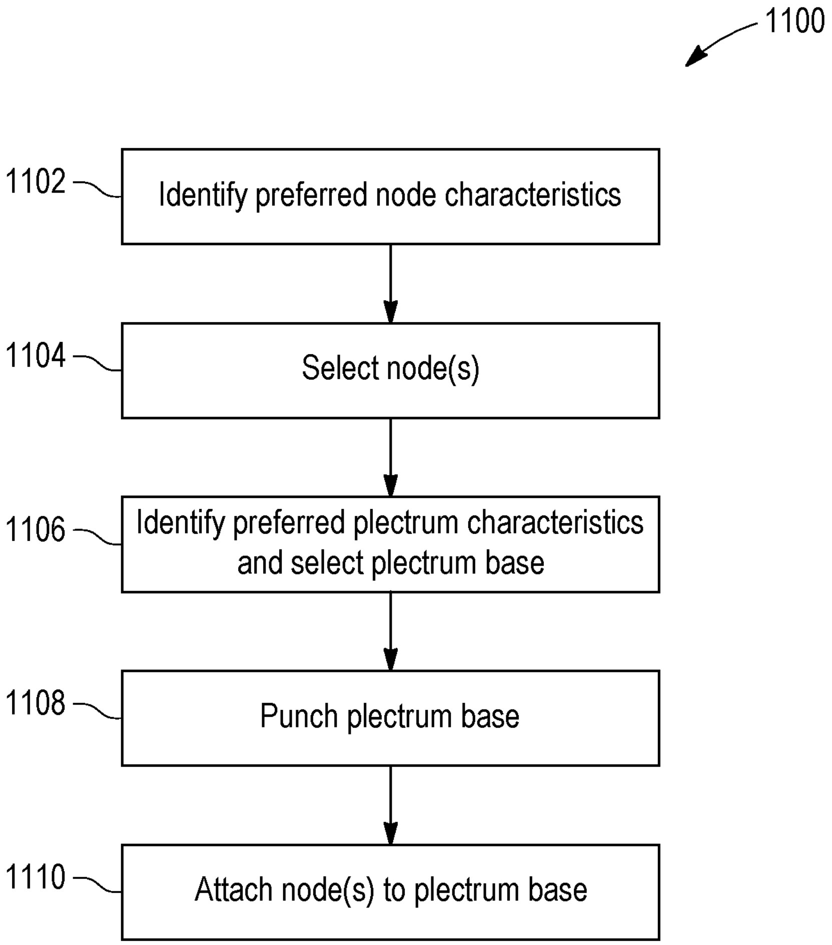
FIG. 11 is a chart showing a method for building a customized modular plectrum, according to an embodiment.

FIG. 11 is a chart showing a method 1100 for building a customized modular plectrum, according to an embodiment. At box 1102, a user can identify preferred node characteristics across a number of parameters, including but not limited to the size/shape of the non-thumb finger cradle, the preferred size/shape of the thumb cradle, the preferred angle of the non-thumb finger cradle, and the preferred angle of the thumb cradle. At box 1104, a user can select a non-thumb finger module node and/or thumb module node that correspond to the desired parameters. At box 1106, a user can identify preferred characteristics for a plectrum base, and the user can select a plectrum. The plectrum base can be selected from any available plectra, including traditional off-the-shelf flat plectra. In an embodiment with keyed module nodes, at box 1108, the plectrum can be punched to accommodate a keyed module node. At box 1110, the non-thumb finger module node and/or the thumb module node can be attached to the plectrum base.

Figure 12A:
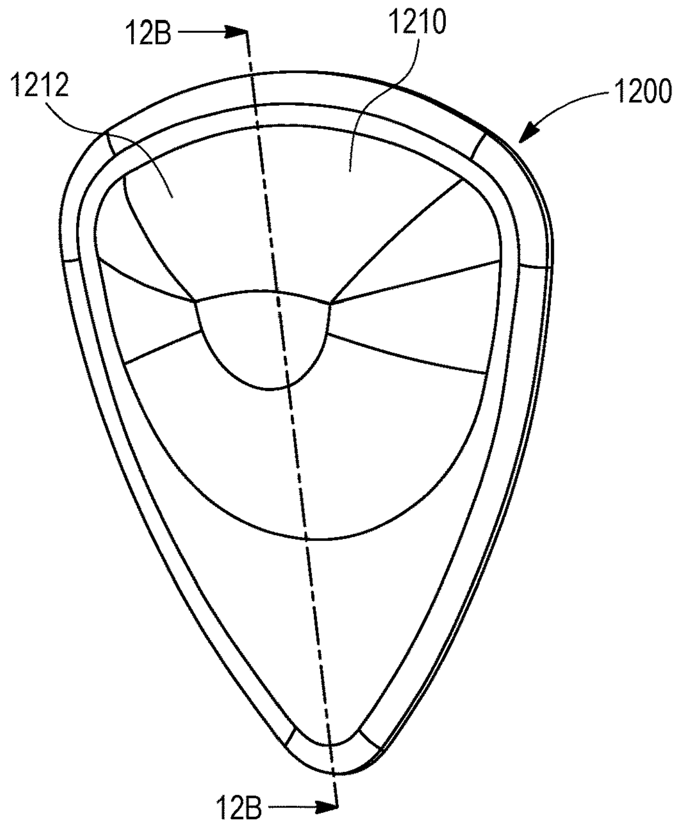
FIG. 12A is a perspective view of a customizable plectrum, according to an embodiment.
Figure 12B:
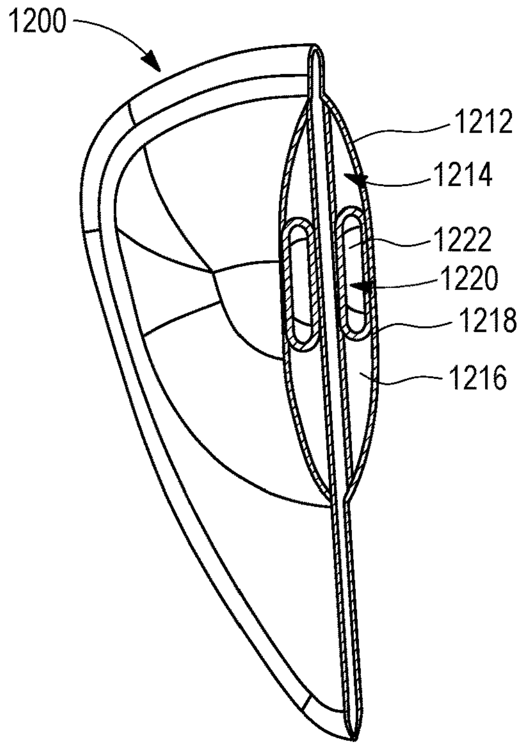
FIG. 12B is a cross section view of the plectrum of FIG. 12A, taken along cross-section line 12B-12B of FIG. 12A, according to an illustrative embodiment.

FIG. 12A is a perspective view of a customizable plectrum, according to an embodiment, and FIG. 12B is a cross section view of the plectrum of FIG. 12A, taken along cross-section line 12B-12B of FIG. 12A, according to an illustrative embodiment. In various embodiments, a customizable plectrum 1200 can have customizable nodes 1210 that can be customized to the fingers and grip style of a user. Nodes 1210 can have a flexible outer skin 1212 that forms a first chamber 1214. Within the first chamber the customizable node can have the first part of an epoxy 1216. A rupturable capsule 1218 within the first chamber 1214 can form a second chamber 1220. A second part of an epoxy 1222 can be contained within the rupturable capsule 1218. A user can squeeze the nodes to rupture the capsules so that the epoxy can set, thereby cementing the nodes into a shape that corresponds to the user's fingers and preferred holding style.

A user can squeeze the node to rupture the capsule 1218, and can massage the nodes 1210 to mix the two parts of the epoxy. The user can grasp and hold the customizable plectrum 1200 using a preferred holding style, and the epoxy can set in a shape that corresponds to the user's fingers and holding style. The resulting customized plectrum will have a non-thumb finger cradle and/or thumb cradle that corresponds to the user's finger size and preferred cradle angle. In various embodiments, this system can be achieved using the 2-part liquid epoxy explained above, or various 2-part epoxy putties, or various time-cure and/or light-cure substances, or various thermally deforming substances, or other means for retaining a locked-in shape for future use. In embodiments using a light cure epoxy, a user can adjust the position of the nodes until the user is satisfied, and then use a light source to cure the epoxy in the desired position. The customizable plectrum allows a user to lock the nodes into a desired shape and have the nodes retain that shape for future use.

In an embodiment, a retailer can provide a service that can scan the fingers and/or holding style of the user, in a manner that can be similar to the way labs can scan molds taken by dentists. After scanning the fingers and/or grip style of the user, a customized plectrum can be designed that corresponds to the user's unique fingers and/or style. In an embodiment, a kit can be sent to a customer that can allow the user to indent finger depressions into a putty-like material, or into an epoxy node such as the one in FIG. 12, on one or both sides of a plectrum. The customer can then take/send the kit to a service provider and the indentions can be scanned to create a digital representation of the finger contours showing the fingers in a gripping state. The digital representation can then be used to create customized plectra that can include custom molded plectra or customized modular plectra assembled from module parts, as described herein. In various embodiments, a database of these custom geometries can be maintained so that new customized plectra can be created for the same customer again in the future. Customized plectra with a customer's saved geometry can be created while also adjusting desired parameters. By way of non-limiting example, this could include creating a customized plectra with saved node geometries applied to plectra with different thickness, hardness, etc. Previous custom contours can also be applied to new plectra with newly developed plectrum technologies.

A database of all customer data can include all parameters that are measured and/or taken into account in the system described herein. This data can then be examined in the aggregate to refine a standard set of module components so that the broadest possible customer base can be accommodated. In various embodiments, the aggregate database can allow a retailer to focus on the most common characteristics while leaving some outliers out, so that the retailer can reduce inventory costs while continuing to provide customized plectra for most customers. The database can also be provided to manufacturers of off-the-shelf plectra so that they can learn more about how users hold a plectrum and incorporate that data into future designs. Famous musicians can provide information about their preferred customized plectrum, and that information can be made available to fans who want to play with a similar plectrum.

In various embodiments, a retailer can maintain an on-site imaging system to take pictures/videos of a user's fingers and/or grip style, and those pictures and/or videos can be used to identify finger/thumb/digit/phalange geometry and the nature of the user's preferred method of gripping the plectrum. This information can be used to provide recommended contour geometry or recommended customizing modules. In various embodiments, this can be performed at a retailer location, or could be performed by the customer at home using a phone app that can take the pictures and/or videos. In various embodiments, an on-site system at a retailer can characterize the pinch pressure and location for a user, so that the high-pressure zones between the contour and the fingers can be automatically optimized for maximum comfort, i.e. the least amount of pinch force required for a secure grip on the plectrum. In various embodiments, the imaging software can identify the preferred node angles without the need for graduated markings. The software can use the shape of the pick itself in the image and/or can use visual marks (fiducial marks) on the nodes and/or base picks. The imaging system can guide the punch process by indicating a suggested rotational setting for the punch press shown in FIGS. 10D-E that will result in a preferred node rotational position.

Similarly, the imaging system can guide the placement and orientation of module nodes. The imaging system can guide the user in bonding the nodes in the correct locations and orientations. The imaging system may be able to help determine the preferred location and angle for a module node, and also help the user to apply a module node to a plectrum in the preferred location and orientation. In various embodiments, the imaging system may do so without the need for visible gradients, and can rely on the shape of the pick and/or various other fiducial marks.

In various embodiments, a computer/phone application or web-based service can allow customers to view their scanned geometry. Various tutorials or "wizards" can guide the user through the process of optimal plectrum identification. Customers can adjust the geometry based on the scans and/or previous customized plectra or plectrum components ordered by that customer. By way of non-limiting example, the customer can adjust a customized plectrum to fix areas that may not be ideally comfortable. A user can then order a new customized plectrum with the new characteristics. Adding/removing material on a virtual model and then using a physical plectrum with the adjusted characteristics may help to improve comfort and/or overcome discomfort.

Although the devices and methods described herein are described in the context of musical instrument plectra, it should be made clear that in various embodiments, this technology can be applied to a large number of customized tools. By way of non-limiting examples, these devices and methods can be applied to tools that can range from writing utensils, to dental drills, to various medical tools including scalpels, to children's toothbrushes, to kitchen knives, to various other tools that are gripped and held by hand.

Figure 13A:
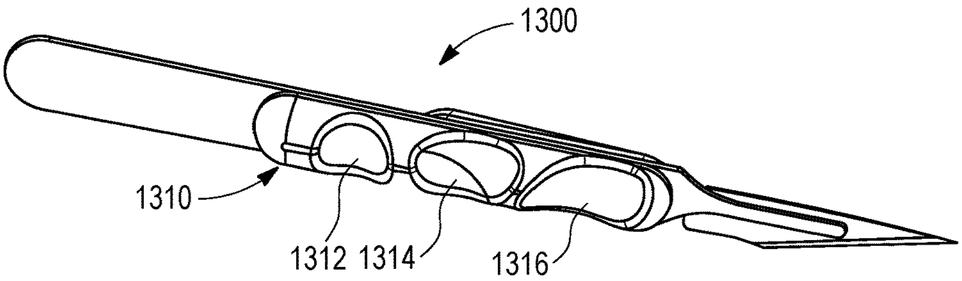
FIG. 13A is a perspective view of a scalpel with ergonomic finger features, according to an illustrative embodiment.
Figure 13B:
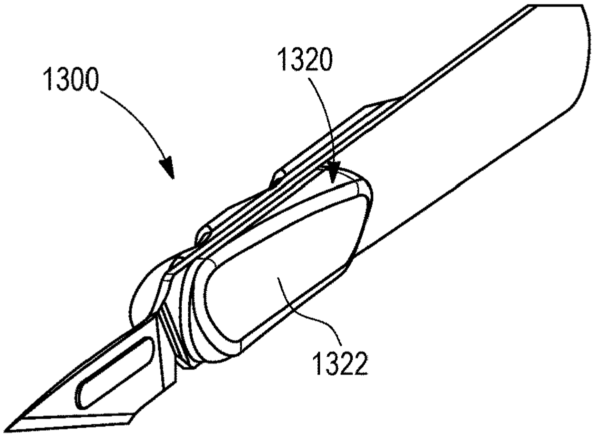
FIG. 13B is a perspective view of a scalpel with ergonomic thumb features, according to an illustrative embodiment.
Figure 13C:
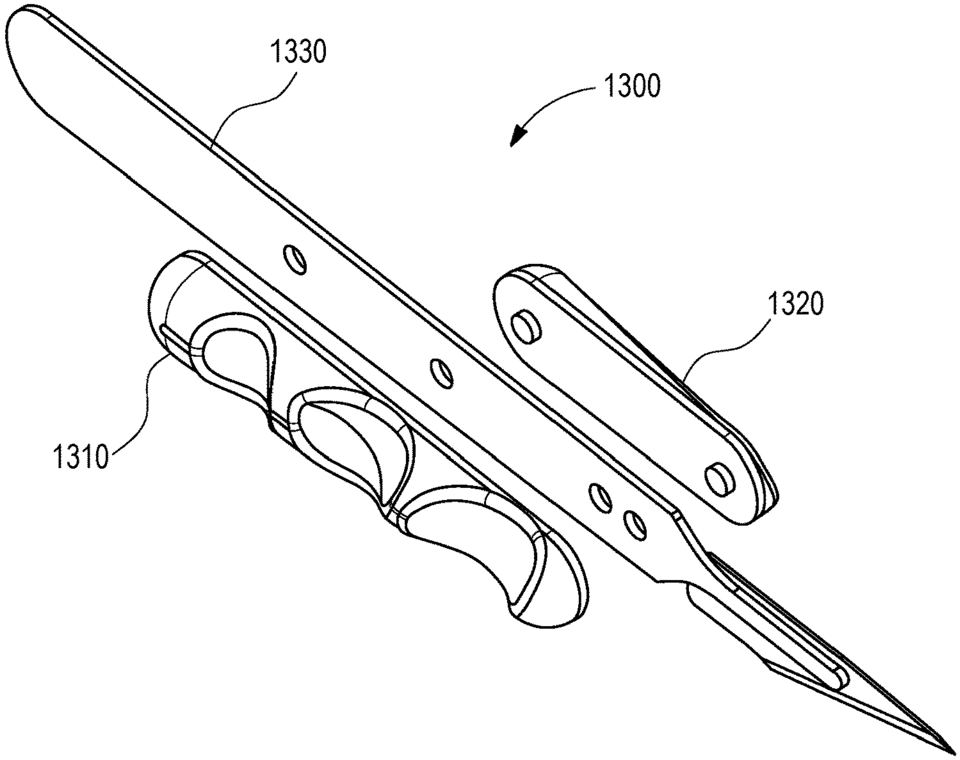
FIG. 13C is an exploded view of a scalpel with ergonomic features, according to the illustrative embodiment.

FIG. 13A is a perspective view of a scalpel with ergonomic finger features, according to an illustrative embodiment, and FIG. 13B is a perspective view of a scalpel with ergonomic thumb features, according to an illustrative embodiment. As shown, a scalpel 1300 can have a finger node 1310. Finger node 1310 can include one or more finger cradles, such as finger cradles 1312, 1314, and 1316 shown in FIG. 13A. Similarly, a scalpel 1300 can have a thumb node 1320, and thumb node 1320 can include thumb cradle 1322. Various systems and methods, including test tools similar to the ones described herein, can be used to help a user identify preferred characteristics across a variety of different parameters for both finger nodes and thumb nodes. FIG. 13C is an exploded view of a scalpel with ergonomic features, according to the illustrative embodiment. After a user has identified preferred characteristics, a user can create a scalpel with the desired characteristics. In various embodiments, creating a scalpel with the desired characteristics can include adding nodes such as finger node 1310 and thumb node 1320 to an underlying scalpel 1330, or can include rupturing an epoxy capsule, or any of the various other systems and methods described herein.

Although the example in FIGS. 13A-13C depicts a scalpel, it should be clear that the technology described herein can be applied to various hand-held tools, including but not limited to, writing utensils, dental drills, various medical tools including scalpels, toothbrushes, kitchen knives, and various other tools that are gripped and held by hand. The systems and methods described herein can be used to determine finger and/or thumb cradle sizes, finger and/or thumb cradle angles, finger and/or thumb cradle shapes, arrangement and positioning of cradles, cradle textures, etc. for any number of handheld tools.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, in various embodiments, cradles can be incorporated into a plectrum through any number of different means, including, but not limited to, thermosetting putty that can partially embrace a finger to the addition of one or more ridges that can define the edges of a cradle without making contact with a finger from one ridge to another. Also, as used herein, various directional and orientational terms (and grammatical variations thereof) such as "vertical," "horizontal," "up," "down," "bottom," "top," "side," "front," "rear," "left," "right," "forward," "rearward," and the like, are used only as relative conventions and not as absolute orientations with respect to a fixed coordinate system, such as the acting direction of gravity. Additionally, where the term "substantially" or "approximately" is employed with respect to a given measurement, value, or characteristic, it refers to a quantity that is within a normal operating range to achieve desired results, but that includes some variability due to inherent inaccuracy and error within the allowed tolerances (e.g. 1-2%) of the system. Accordingly, this description is meant to be taken only by way of example, and not to otherwise limit the scope of this invention.

What is claimed is:

1. An ergonomic plectrum, the plectrum comprising:

a plectrum base; and at least one cradle, the cradle adapted to partially engage with a finger of a user, wherein the at least one cradle includes two cradles, wherein a thumb cradle is adapted to partially engage with a thumb, and a non-thumb cradle is adapted to partially engage with a non-thumb finger.

2. The plectrum of claim 1, wherein the plectrum base is planar, and the at least one cradle is raised above the planar plectrum.

3. The plectrum of claim 2, further comprising at least one node, wherein the at least one cradle is a concavity within the node.

4. The plectrum of claim 1, wherein the thumb cradle is at a first angle adapted to accommodate a thumb, and the non-thumb finger cradle is at a second angle adapted to accommodate a non-thumb finger.

5. The plectrum of claim 4, wherein the thumb cradle has a curved surface with a shape that is adapted to accommodate and partially encircle a thumb, and the non-thumb finger cradle has a curved surface with a shape that is adapted to accommodate and partially encircle a non-thumb finger.

6. A modular customized plectrum system, the plectrum system comprising;

a plectrum base; and at least one module node, the at least one module node having a cradle, and the at least one module node adapted to be attached to the plectrum base;

wherein the plectrum base includes at least one keyhole, and wherein the at least one module node has at least one key, wherein the at least one key is adapted to engage the at least one keyhole, wherein the at least one key and at least one keyhole can maintain the at least one node in a fixed position relative to the plectrum base.

7. The system of claim 6, wherein the at least one module node is adapted to be secured to the plectrum base at an angle that is adapted to accommodate a finger of a user.

8. The system of claim 6, wherein the at least one module node further comprises at least two module nodes, and wherein a first module node is adapted to be secured to the plectrum base at an angle that is adapted to accommodate a thumb of a user, and wherein a second module node is adapted to be secured to the plectrum base at an angle that is adapted to accommodate a non-thumb finger of a user.

9. A customized plectrum kit, the kit comprising:

a plurality of different thumb nodes, wherein the thumb nodes include at least three different sizes of thumb cradles, the thumb nodes adapted to be attached to a plectrum base; and a plurality of different non-thumb finger nodes, wherein the non-thumb finger nodes include at least three different sizes of finger cradles, the non-thumb finger nodes adapted to be attached to the plectrum base.

10. The kit of claim 9, wherein the plurality of different thumb nodes includes at least three different cradle angles for each of the at least three different sizes of thumb cradles, and wherein the plurality of different non-thumb finger nodes includes at least three different cradle angles for each of the at least three different sizes of non-thumb cradles.

11. The kit of claim 9, wherein the plurality of different thumb nodes includes at least three different attack positions for each of the at least three different sizes of thumb cradles, and wherein the plurality of different non-thumb finger nodes includes at least three different attack positions for each of the at least three different sizes of non-thumb cradles.

12. The kit of claim 9, wherein the nodes have at least one key on the back of the nodes, the key adapted to engage with at least one keyhole on the plectrum base.

13. The plectrum of claim 2, wherein the at least one cradle is defined by a curved contact surface.

* * * * *